US006862652B1

(12) United States Patent
Tsuji

(10) Patent No.: US 6,862,652 B1
(45) **Date of Patent: *Mar. 1, 2005**

(54) RECORDING APPARATUS, SEMICONDUCTOR DEVICE, AND RECORDING HEAD DEVICE

(75) Inventor: Ryuichi Tsuji, Matsumoto (JP)

(73) Assignee: Seiko Epson Corporation (JP)

( * ) Notice: Subject to any disclaimer, the term of this patent is extended or adjusted under 35 U.S.C. 154(b) by 140 days.

This patent is subject to a terminal disclaimer.

(21) Appl. No.: 09/857,483

(22) PCT Filed: Oct. 4, 2000

(86) PCT No.: PCT/JP00/06906

§ 371 (c)(1),
(2), (4) Date: Jun. 4, 2001

(87) PCT Pub. No.: WO01/25016

PCT Pub. Date: Apr. 12, 2001

(30) Foreign Application Priority Data

Oct. 4, 1999 (JP) .......................................... 11-283241

(51) Int. Cl.[7] ................................................ G06F 12/00
(52) U.S. Cl. .......................... 711/103; 711/156; 347/19
(58) Field of Search ................................ 711/103, 156; 347/7, 19, 50, 86

(56) References Cited

U.S. PATENT DOCUMENTS

| | | | |
|---|---|---|---|
| 5,610,635 A | 3/1997 | Murray et al. | |
| 5,835,817 A | * 11/1998 | Bullock et al. | 399/25 |
| 5,995,774 A | * 11/1999 | Applegate et al. | 399/27 |

(List continued on next page.)

FOREIGN PATENT DOCUMENTS

| | | |
|---|---|---|
| JP | 62-184856 A | 8/1987 |
| JP | 6-320372 | 11/1994 |
| JP | 06-320732 | 11/1994 |
| JP | 7-156375 A | 6/1995 |
| JP | 8-197748 A | 8/1996 |
| JP | 10-100395 A | 4/1998 |
| JP | 10-235850 A | 9/1998 |

OTHER PUBLICATIONS

Patent Application Entitled: Ink Jet Recording Apparatus, Semiconductor Device, and Recording Head Apparatus, Inventor: Ryuichi Tsuji, filed: Jun. 4, 2001.

*Primary Examiner*—Matthew Kim
*Assistant Examiner*—Woo H. Choi
(74) *Attorney, Agent, or Firm*—Harness, Dickey & Pierce, P.L.C.

(57) ABSTRACT

An apparatus main body controlling section 2 and a memory access controlling section 3 transmit and receive data by means of serial data communication. The memory access controlling section 3 reads various information (the amount of remaining ink, use start year and month, and the like) stored in non-volatile memories 4 and 5 and stores the readout information in a RAM in the memory access controlling section 3. The apparatus main body controlling section 2 issues an access request command to the RAM to read out and renew the information. When a power supply to a printer is turned off, the apparatus main body controlling section 2 issues an information write back command. The memory access controlling section 3 writes the information in the RAM back to the non-volatile memories 4 and 5. Reads from and writes to the non-volatile memories 4 and 5 are thus executed via the memory access controlling section 3, thereby reducing the amount of processing to be executed by the apparatus main body controlling section 2 to access the non-volatile memories 4 and 5.

12 Claims, 22 Drawing Sheets

U.S. PATENT DOCUMENTS

| | | | | | |
|---|---|---|---|---|---|
| 6,000,773 | A | * | 12/1999 | Murray et al. | 347/7 |
| 6,044,022 | A | * | 3/2000 | Nachumovsky | 365/185.28 |
| 6,104,430 | A | * | 8/2000 | Fukuoka | 348/231.6 |
| 6,196,670 | B1 | | 3/2001 | Saruta | |
| 6,267,463 | B1 | * | 7/2001 | Paulsen et al. | 347/19 |
| 6,371,586 | B1 | | 4/2002 | Saruta | |
| 6,447,090 | B1 | | 9/2002 | Saruta | |
| 6,494,559 | B1 | * | 12/2002 | Tsuji | 347/19 |
| 6,565,198 | B2 | | 5/2003 | Saruta | |
| 6,575,548 | B1 | * | 6/2003 | Corrigan et al. | 347/19 |
| 6,631,967 | B1 | | 10/2003 | Saruta | |
| 2002/0015066 | A1 | * | 2/2002 | Siwinski et al. | 347/19 |
| 2002/0085051 | A1 | | 7/2002 | Saruta | |
| 2002/0180851 | A1 | | 12/2002 | Saruta | |
| 2002/0196302 | A1 | | 12/2002 | Saruta | |
| 2003/0007027 | A1 | | 1/2003 | Saruta | |
| 2003/0197751 | A1 | | 10/2003 | Saruta | |
| 2004/0095407 | A1 | | 5/2004 | Saruta | |

* cited by examiner

FIG. 3

INFORMATION STORED IN THE NON-VOLATILE MEMORIES

| NUMBER | NUMBER OF BITS IN DATA | ADDRESS COUNTER VALUE | ADDRESS | | INFORMATION NUMBER | |
|---|---|---|---|---|---|---|
| | | | START | END | FIRST MEMORY | SECOND MEMORY |
| 1 | 8 | 0 | 00 | 07 | INFORMATION 0 | INFORMATION 35 |
| 2 | 8 | 8 | 08 | 0F | INFORMATION 1 | INFORMATION 36 |
| 3 | 8 | 16 | 10 | 17 | INFORMATION 2 | INFORMATION 37 |
| 4 | 8 | 24 | 18 | 1F | INFORMATION 3 | INFORMATION 38 |
| 5 | 8 | 32 | 20 | 27 | INFORMATION 4 | INFORMATION 39 |
| 6 | 8 | 40 | 28 | 2F | INFORMATION 5 | INFORMATION 40 |
| 7 | 8 | 48 | 30 | 37 | INFORMATION 6 | INFORMATION 41 |
| 8 | 16 | 56 | 38 | 47 | INFORMATION 7 | INFORMATION 42 |
| 9 | 8 | 72 | 48 | 4F | INFORMATION 8 | INFORMATION 43 |
| 10 | 7 | 80 | 50 | 56 | INFORMATION 9 | INFORMATION 44 |
| 11 | 4 | 87 | 57 | 5A | INFORMATION 10 | INFORMATION 45 |
| 12 | 5 | 91 | 5B | 5F | INFORMATION 11 | INFORMATION 46 |
| 13 | 5 | 96 | 60 | 64 | INFORMATION 12 | INFORMATION 47 |
| 14 | 6 | 101 | 65 | 6A | INFORMATION 13 | INFORMATION 48 |
| 15 | 8 | 107 | 6B | 72 | INFORMATION 14 | INFORMATION 49 |
| 16 | 5 | 115 | 73 | 77 | INFORMATION 15 | INFORMATION 50 |
| 17 | 5 | 120 | 78 | 7C | INFORMATION 16 | INFORMATION 51 |
| 18 | 1 | 125 | 7D | 7D | INFORMATION 17 | INFORMATION 52 |
| 19 | 3 | 126 | 7E | 80 | INFORMATION 18 | INFORMATION 53 |
| 20 | 10 | 129 | 81 | 8A | INFORMATION 19 | INFORMATION 54 |
| 21 | 10 | 139 | 8B | 94 | INFORMATION 20 | INFORMATION 55 |
| 22 | 8 | 149 | 95 | 9C | INFORMATION 21 | INFORMATION 56 |
| 23 | 8 | 157 | 9D | A4 | INFORMATION 22 | INFORMATION 57 |
| 24 | 6 | 165 | A5 | AA | INFORMATION 23 | INFORMATION 58 |
| 25 | 5 | 171 | AB | AF | INFORMATION 24 | INFORMATION 59 |
| 26 | 8 | 176 | B0 | B7 | INFORMATION 25 | INFORMATION 60 |
| 27 | 8 | 184 | B8 | BF | INFORMATION 26 | INFORMATION 61 |
| 28 | 8 | 192 | C0 | C7 | INFORMATION 27 | INFORMATION 62 |
| 29 | 8 | 200 | C8 | CF | INFORMATION 28 | INFORMATION 63 |
| 30 | 8 | 208 | D0 | D7 | INFORMATION 29 | INFORMATION 64 |
| 31 | 8 | 216 | D8 | DF | INFORMATION 30 | INFORMATION 65 |
| 32 | 8 | 224 | E0 | E7 | INFORMATION 31 | INFORMATION 66 |
| 33 | 8 | 232 | E8 | EF | INFORMATION 32 | INFORMATION 67 |
| 34 | 8 | 240 | F0 | F7 | INFORMATION 33 | INFORMATION 68 |
| 35 | 8 | 248 | F8 | FF | INFORMATION 34 | INFORMATION 69 |

FIG. 5

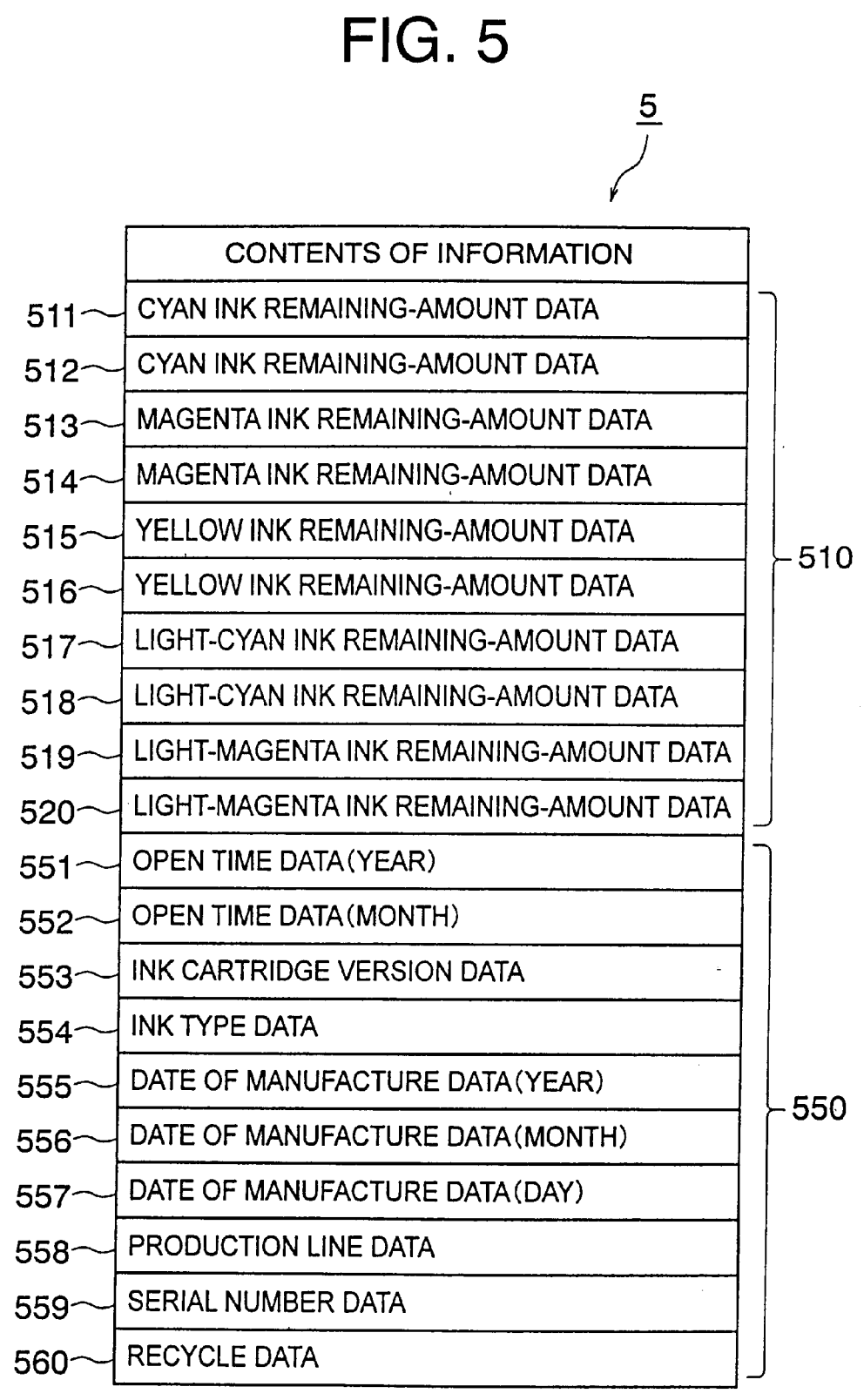

5

| Ref. | CONTENTS OF INFORMATION | Group |
|---|---|---|
| 511 | CYAN INK REMAINING-AMOUNT DATA | 510 |
| 512 | CYAN INK REMAINING-AMOUNT DATA | 510 |
| 513 | MAGENTA INK REMAINING-AMOUNT DATA | 510 |
| 514 | MAGENTA INK REMAINING-AMOUNT DATA | 510 |
| 515 | YELLOW INK REMAINING-AMOUNT DATA | 510 |
| 516 | YELLOW INK REMAINING-AMOUNT DATA | 510 |
| 517 | LIGHT-CYAN INK REMAINING-AMOUNT DATA | 510 |
| 518 | LIGHT-CYAN INK REMAINING-AMOUNT DATA | 510 |
| 519 | LIGHT-MAGENTA INK REMAINING-AMOUNT DATA | 510 |
| 520 | LIGHT-MAGENTA INK REMAINING-AMOUNT DATA | 510 |
| 551 | OPEN TIME DATA (YEAR) | 550 |
| 552 | OPEN TIME DATA (MONTH) | 550 |
| 553 | INK CARTRIDGE VERSION DATA | 550 |
| 554 | INK TYPE DATA | 550 |
| 555 | DATE OF MANUFACTURE DATA (YEAR) | 550 |
| 556 | DATE OF MANUFACTURE DATA (MONTH) | 550 |
| 557 | DATE OF MANUFACTURE DATA (DAY) | 550 |
| 558 | PRODUCTION LINE DATA | 550 |
| 559 | SERIAL NUMBER DATA | 550 |
| 560 | RECYCLE DATA | 550 |

FIG. 7

| TERMINAL NAME | I/O | DESCRIPTION OF TERMINALS (SIGNALS) | | INITIAL VALUE |
|---|---|---|---|---|
| RXD | IN | SERIAL DATA INPUT SIGNAL (BAUD RATE: 125 Kbps) | | |
| TXD | OUT | SERIAL DATA OUTPUT SIGNAL (BAUD RATE: 125 Kbps) | | H |
| SEL | IN | COMMAND SELECTION SIGNAL, L: LEVEL 0, H: LEVEL 1 | | |
| CS1 | Tri | SELECTION SIGNAL FOR THE FIRST NON-VOLATILE MEMORY | L: NON-SELECT<br>H: SELECT<br>HIZ FOR POWER-OFF | HiZ (L) |
| CS2 | Tri | SELECTION SIGNAL FOR THE SECOND NON-VOLATILE MEMORY | | |
| IO1 | I/O | DATA SIGNAL FOR THE FIRST NON-VOLATILE MEMORY | HIZ FOR POWER-OFF | HiZ (HiZ) |
| IO2 | I/O | DATA SIGNAL FOR THE SECOND NON-VOLATILE MEMORY | | |
| RW1 | Tri | R/W SIGNAL FOR THE FIRST NON-VOLATILE MEMORY | L: READ H: WRITE<br>HIZ FOR POWER-OFF | HiZ (L) |
| RW2 | Tri | R/W SIGNAL FOR THE SECOND NON-VOLATILE MEMORY | | |
| CK1 | Tri | CLOCK SIGNAL FOR THE FIRST NON-VOLATILE MEMORY | HIZ FOR POWER-OFF | HiZ (L) |
| CK2 | Tri | CLOCK SIGNAL FOR THE SECOND NON-VOLATILE MEMORY | | |
| PW1 | Tri | POWER SUPPLY TO THE FIRST NON-VOLATILE MEMORY | H: POWER SUPPLY<br>HIZ: NO POWER SUPPLY | HiZ (H) |
| PW2 | Tri | POWER SUPPLY TO THE SECOND NON-VOLATILE MEMORY | | |
| OSC1 | IN | CONNECTION TERMINAL FOR THE CERAMIC OSCILLATOR | OSCILLATING FREQUENCY: 16MHz | |
| OSC2 | OUT | CONNECTION TERMINAL FOR THE CERAMIC OSCILLATOR | | |
| RST | IN | INITIAL RESET SIGNAL (L: ACTIVE) | | |
| ES | IN | NON-VOLATILE MEMORY WRITE TIME SELECTION L: 3.0ms H: 3.5ms | | |
| M1<br>M2<br>M3<br>M4 | IN | MONITOR OUTPUT SELECTION SIGNAL (TESTING SIGNAL)<br>CAUSE A SIGNAL INSIDE THE IC TO BE OUTPUT TO THE OUTPUT TERMINAL OF THE NON-VOLATILE MEMORY.<br>M1 TO M4 ALL SET TO L :NORMAL OUTPUT<br>OTHER CONDITIONS: INTERNAL MONITOR OUTPUTS | | |
| VCC1 | +5V | POWER SUPPLY 1 (2 TERMINALS) | | |
| VCC2 | +3.3V | POWER SUPPLY 2 (3 TERMINALS) | | |
| VSS | GND | GND (5 TERMINALS) | | |

FIG. 8

(a) 8-BIT FIXED LENGTH COMMAND WHEN SEL IS AT THE L LEVEL

| COMMAND | COMMAND DATA | CONTENTS |
|---|---|---|
| POWER-OFF PROCESS (NM1) | 10000000 | POWER-OFF SEQUENCE |
| INITIALIZATION (RST) | 10010000 | RESET |
| MODE SETTING (MDSET) | 1010xxxx | SET TO DESIGNATED MODE<br>xxxx=0010 MODE 2 |

(b) VARIABLE-LENGTH COMMAND WHEN SEL IS AT THE H LEVEL

| | |
|---|---|
| OPERATION MODE | COMMAND LENGTH (1 TO 7 BYTES) |
| COMMAND | DATA LENGTH (1 TO 4 BYTES) |
| LOWEST ADDRESS (8 BITS) | A7 — A0 |
| HIGHEST ADDRESS (8 BITS) | A15 — A8 |
| DATA (8 BITS) | D7 — D0 |
| DATA (8 BITS) | D7 — D0 |
| DATA (8 BITS) | D7 — D0 |
| DATA (8 BITS) | D7 — D0 |

FIG. 11

| CLASSIFICATION | ITEM | READOUT (READ) | WRITE (WRITE) | REMARKS |
|---|---|---|---|---|
| (a) VARIABLE-LENGTH COMMAND (REQUEST) | MODE (4 BITS) | 0010 | 0010 | OPERATION MODE 2 |
| | COMMAND LENGTH (4 BITS) | 3 BYTES : 0011<br>4 BYTES : 0100<br>5 BYTES : 0101<br>7 BYTES : 0111 | 3 BYTES : 0011<br>4 BYTES : 0100<br>5 BYTES : 0101<br>7 BYTES : 0111 | NUMBER OF BYTES IN A COMMAND |
| | COMMAND (4 BITS) | 0000 | 1000 | |
| | DATA LENGTH (4 BITS) | 1 BYTE : 0001<br>2 BYTES : 0010<br>4 BYTES : 0100<br>0,3,5 TO 15 BYTES ARE PROHIBITED FROM BEING SET. | 1 BYTE : 0001<br>2 BYTES : 0010<br>4 BYTES : 0100<br>0,3,5 TO 15 BYTES ARE PROHIBITED FROM BEING SET. | NUMBER OF BYTES IN DATA TO BE READ OR WRITTEN |
| | ADDRESS (16 BITS) | A15~A0 (16 BITS) | A15~A0 (16 BITS) | ONLY 8 LEAST SIGNIFICANT BITS ARE USED |
| | DATA (8 BITS × n) | ——— | 8 BITS × n (n : DATA LENGTH) | |
| (b) RESPONSE | MODE (4 BITS) | 0010 | ——— | OPERATION MODE 2 |
| | DATA LENGTH (4 BITS) | 1 BYTE : 0001<br>2 BYTES : 0010<br>4 BYTES : 0100<br>0,3,5 TO 15 BYTES ARE PROHIBITED FROM BEING SET. | ——— | |
| | DATA (8 BITS × n) | 8 BITS × n (n : DATA LENGTH) | ——— | |

FIG. 12

| ADDRESS (HEXADECIMAL NOTATION) | REGISTER NAME | BIT | FUNCTION |
|---|---|---|---|
| 80 | ACCCESS PERMISSION SETTING | [1:0] | SET PERMISSION FOR/REJECTION OF ACCESSES TO THE NON-VOLATILE MEMORIES (INITIAL VALUE: 00)<br>SET THE TERMINALS CS, CK, RW, AND IO IN A HIGH IMPEDANCE/ACTIVE STATE, AND TURN ON/OFF PW.<br>0: HIGH IMPEDANCE AND POWER-OFF<br>1: ACTIVE AND POWER-ON<br>STATE OF THE TERMINAL IS SIMULTANEOUSLY SWITCHED FOR ALL THE TERMINALS IMMEDIATELY AFTER THIS BIT IS SET IN THE REGISTER.<br>TERMINALS CS, CK, AND RW ARE AT THE L LEVEL IMMEDIATELY AFTER THIS BIT IS SET TO 1.<br>TERMINAL IO IS SET IN A HIGH IMPEDANCE STATE (DATA INPUT STATE). |
| 84 | READOUT PERMISSION SETTING | [1:0] | SET DATA READOUT PERMISSION/REJECTION (INITIAL VALUE: 00) |
| 85 | ALL-AREA READOUT | ----- | READ OUT DATA FROM ALL THE AREAS OF THE NON-VOLATILE MEMORY |
| 86 | ALL READOUT BUSY | [0] | DATA READOUT BUSY FLAG FOR ALL THE AREAS |
| 88 | ALL WRITE PERMISSION | [1:0] | SET PERMISSION FOR/REJECTION OF WRITES TO ALL THE AREAS OF THE NON-VOLATILE MEMORY (INITIAL VALUE: 00) |
| 89 | ALL-AREA WRITE | ----- | WRITE DATA TO ALL THE AREAS OF THE NON-VOLATILE MEMORY |
| 8A | ALL WRITE BUSY | [0] | DATA WRITE BUSY FLAG FOR ALL THE AREAS |
| 8C | LIMITED WRITE PERMISSION | [1:0] | SET PERMISSION FOR/REJECTION OF LIMITED WRITE TO THE NON-VOLATILE MEMORY (INITIAL VALUE: 00) |
| 8D | LIMITED WRITE | ----- | WRITE DATA TO THE LIMITED AFTER OF THE NON-VOLATILE MEMORY |
| 8E | LIMITED WRITE BUSY | [0] | DATA WRITE BUSY FLAG FOR LIMITED AREAS |
| 90 | POWER-OFF WRITE PERMISSION | [1:0] | SET PERMISSION FOR/REJECTION OF POWER-OFF WRITES TO THE NON-VOLATILE MEMORY (INITIAL VALUE: 00) |
| 92 | POWER-OFF WRITE BUSY | [0] | POWER-OFF DATA WRITE BUSY FLAG |

FIG. 13

RAM ADDRESSES AND STORED INFORMATION

| FIRST RAM | | | SECOND RAM | | |
|---|---|---|---|---|---|
| ADDRESS | DATA LANGTH | INFORMATION NUMBER | ADDRESS | DATA LANGTH | INFORMATION NUMBER |
| 00 | 1 | INFORMATION 0 | 40 | 1 | INFORMATION 35 |
| 01 | 1 | INFORMATION 1 | 41 | 1 | INFORMATION 36 |
| 02 | 1 | INFORMATION 2 | 42 | 1 | INFORMATION 37 |
| 03 | 1 | INFORMATION 3 | 43 | 1 | INFORMATION 38 |
| 04 | 1 | INFORMATION 4 | 44 | 1 | INFORMATION 39 |
| 05 | 1 | – | 45 | 1 | – |
| 06 | 1 | INFORMATION 5 | 46 | 1 | INFORMATION 40 |
| 07 | 1 | INFORMATION 6 | 47 | 1 | INFORMATION 41 |
| 08 | 2 | INFORMATION 7 | 48 | 2 | INFORMATION 42 |
| 0A | 1 | INFORMATION 8 | 4A | 1 | INFORMATION 43 |
| 0B | 1 | – | 4B | 1 | – |
| 0C | 1 | INFORMATION 9 | 4C | 1 | INFORMATION 44 |
| 0D | 1 | INFORMATION 10 | 4D | 1 | INFORMATION 45 |
| 0E | 1 | INFORMATION 11 | 4E | 1 | INFORMATION 46 |
| 0F | 1 | INFORMATION 12 | 4F | 1 | INFORMATION 47 |
| 10 | 1 | INFORMATION 13 | 50 | 1 | INFORMATION 48 |
| 11 | 1 | INFORMATION 14 | 51 | 1 | INFORMATION 49 |
| 12 | 1 | INFORMATION 15 | 52 | 1 | INFORMATION 50 |
| 13 | 1 | INFORMATION 16 | 53 | 1 | INFORMATION 51 |
| 14 | 1 | INFORMATION 17 | 54 | 1 | INFORMATION 52 |
| 15 | 1 | INFORMATION 18 | 55 | 1 | INFORMATION 53 |
| 16 | 2 | INFORMATION 19 | 56 | 2 | INFORMATION 54 |
| 18 | 2 | INFORMATION 20 | 58 | 2 | INFORMATION 55 |
| 1A | 1 | INFORMATION 21 | 5A | 1 | INFORMATION 56 |
| 1B | 1 | INFORMATION 22 | 5B | 1 | INFORMATION 57 |
| 1C | 1 | INFORMATION 23 | 5C | 1 | INFORMATION 58 |
| 1D | 1 | INFORMATION 24 | 5D | 1 | INFORMATION 59 |
| 1E | 1 | INFORMATION 25 | 5E | 1 | INFORMATION 60 |
| 1F | 1 | INFORMATION 26 | 5F | 1 | INFORMATION 61 |
| 20 | 1 | INFORMATION 27 | 60 | 1 | INFORMATION 62 |
| 21 | 1 | INFORMATION 28 | 61 | 1 | INFORMATION 63 |
| 22 | 1 | INFORMATION 29 | 62 | 1 | INFORMATION 64 |
| 23 | 1 | INFORMATION 30 | 63 | 1 | INFORMATION 65 |
| 24 | 1 | INFORMATION 31 | 64 | 1 | INFORMATION 66 |
| 25 | 1 | INFORMATION 32 | 65 | 1 | INFORMATION 67 |
| 26 | 1 | INFORMATION 33 | 66 | 1 | INFORMATION 68 |
| 27 | 1 | INFORMATION 34 | 67 | 1 | INFORMATION 69 |

THE ADDRESSES ARE IN THE HEXADECIMAL NOTATION AND THE DATA LENGTH IS EXPRESSED IN BYTES.

FIG. 15 (a)

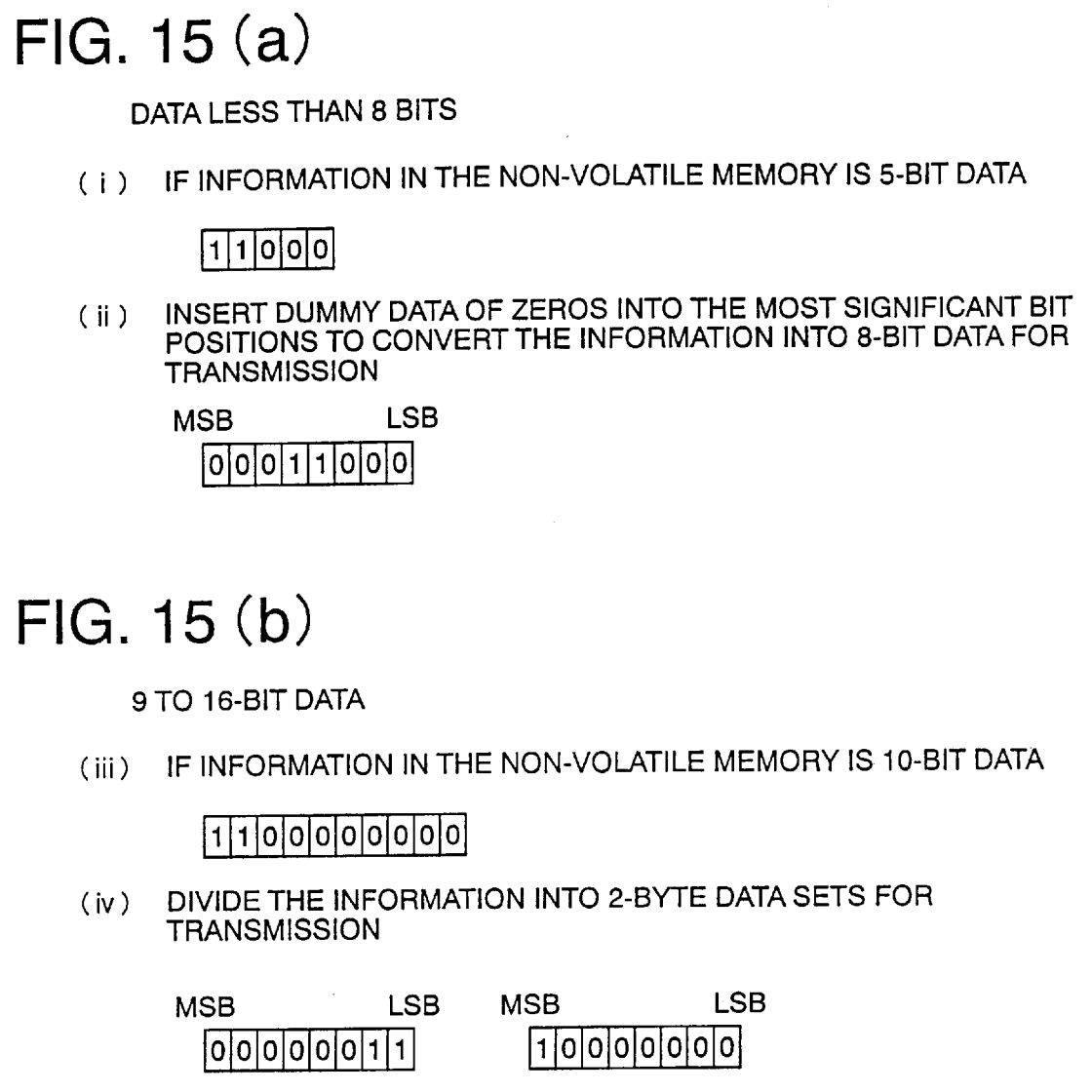

DATA LESS THAN 8 BITS ( i ) IF INFORMATION IN THE NON-VOLATILE MEMORY IS 5-BIT DATA

| | | | | |
|---|---|---|---|---|
| 1 | 1 | 0 | 0 | 0 |

( ii ) INSERT DUMMY DATA OF ZEROS INTO THE MOST SIGNIFICANT BIT POSITIONS TO CONVERT THE INFORMATION INTO 8-BIT DATA FOR TRANSMISSION

MSB LSB

| | | | | | | | |
|---|---|---|---|---|---|---|---|
| 0 | 0 | 0 | 1 | 1 | 0 | 0 | 0 |

FIG. 15 (b)

9 TO 16-BIT DATA ( iii ) IF INFORMATION IN THE NON-VOLATILE MEMORY IS 10-BIT DATA

| | | | | | | | | | |
|---|---|---|---|---|---|---|---|---|---|
| 1 | 1 | 0 | 0 | 0 | 0 | 0 | 0 | 0 | 0 |

( iv ) DIVIDE THE INFORMATION INTO 2-BYTE DATA SETS FOR TRANSMISSION

MSB LSB

| | | | | | | | |
|---|---|---|---|---|---|---|---|
| 0 | 0 | 0 | 0 | 0 | 0 | 1 | 1 |

MSB LSB

| | | | | | | | |
|---|---|---|---|---|---|---|---|
| 1 | 0 | 0 | 0 | 0 | 0 | 0 | 0 |

RECORDING APPARATUS, SEMICONDUCTOR DEVICE, AND RECORDING HEAD DEVICE

TECHNICAL FIELD

The present invention relates to a recording apparatus having a non-volatile memory in a recording material accommodating cartridge so that various data (remaining amount data, use start date data, recording material type data, manufacturing managing data, etc.) on a cartridge can be stored in the non-volatile memory to manage use conditions for each cartridge, and in particular, to a recording apparatus having an interface circuit (memory access controlling circuit) between a control section of a recording apparatus main body and the non-volatile memory to reduce the amount of processing to be executed by the control section to access the non-volatile memory, as well as a semiconductor device for use as the interface and a recording head apparatus comprising the semiconductor device for use as the interface.

BACKGROUND ART

Japanese Patent Laid-Open No. 62-184856 (Japanese Patent No. 2594912) describes an ink cartridge and a recording apparatus in which the ink cartridge has a non-volatile memory in which data corresponding to the amount of remaining ink stored in order to manage the amount of remaining ink for each cartridge.

Japanese Patent Laid-Open No. 8-197748 describes an ink jet printer including an ink cartridge having a non-volatile memory in which ID information is stored and a printer main body correlating the ID information for the ink cartridge read out from the non-volatile memory with the amount of remaining ink so as to eliminate the need to redetect the amount of remaining ink when an ink cartridge with the same ID information is reinstalled.

The conventional recording apparatus and the like use what is called a bit-sequential-access type non-volatile memory that allows data to be written thereto and read out therefrom in a bit serial manner, in order to reduce the number of signal lines between the control section of the printer main body and the non-volatile memory. Since, however, the non-volatile memory is accessed in a bit serial manner, a large amount of time is required for writes and readouts. Thus, if the control section (a CPU or the like) of the printer main body directly controls access to the non-volatile memory, while the non-volatile memory is being accessed, the control section (the CPU or the like) cannot execute other processes. This may causes a delay in a printing process or a response to an operational input from an operation section.

The present invention is provided to solve these problems, and it is an object thereof to provide a recording apparatus having a memory access controlling section between a control section of a recording apparatus main body and a non-volatile memory to reduce the amount of processing executed by the control section to access the non-volatile memory, as well as a semiconductor device and a recording head apparatus which are used for this purpose.

DISCLOSURE OF THE INVENTION

A recording apparatus according to the present invention is characterized by having a memory access controlling section between an apparatus main body controlling section provided in a recording apparatus main body and a non-volatile memory provided in a recording material accommodating cartridge, in order to control writes to and readouts from the non-volatile memory based on commands supplied by the apparatus main body controlling section.

Thus, the recording apparatus according to the present invention is configured to execute writes to and readouts from the non-volatile memory via the memory access controlling section, thereby reducing the amount of processing to be executed by the apparatus main body controlling section to access the non-volatile memory.

An embodiment of the recording apparatus according to the present invention is characterized in that the memory access controlling section comprises a serial data communicating section for executing serial data communication with the apparatus main body controlling section, a command executing section for interpreting and executing a command supplied by the apparatus main body controlling section via the serial data communicating section, a non-volatile memory write and readout controlling section for executing writes to and readouts from the non-volatile memory, and a random access memory for temporarily storing data read out from the non-volatile memory, and in that the apparatus main body controlling section causes data stored in the non-volatile memory to be transferred to the random access memory, causes various processes to be executed by referencing the data stored in the random access memory to update the data stored in the random access memory, and then causes the data stored in the random access memory to be transferred to the non-volatile memory.

The serial data communicating section is thus provided to serially communicate data between the apparatus main body controlling section and the memory access controlling section, thus making it possible to reduce the number of signal lines required between the apparatus main body controlling section and the memory access controlling section.

Further, the random access memory is provided, in which data read out from the non-volatile memory are all stored so that the stored data can be read out in response to a data readout request from the apparatus main body controlling section, thus making it possible to respond to data readout requests at a high speed.

Furthermore, the apparatus main body controlling section can generate a data write request to renew data in the random access memory and then cause the data renewed in response to the data write request to be written to the non-volatile memory. Accordingly, even with a plurality of data items to be renewed, the plurality of data can be written to the non-volatile memory with a single write operation.

A semiconductor device according to the present invention is characterized by having a memory access controlling section formed on a semiconductor substrate, for controlling writes to and readouts from a non-volatile memory based on commands supplied by an apparatus main body controlling section.

Thus, in the semiconductor device according to the present invention, the memory access controlling section is formed on the semiconductor substrate to constitute an integrated circuit, thereby contributing to reducing the size of the recording apparatus.

A recording head apparatus according to the present invention is characterized in that a carriage comprising a section for housing a recording material accommodating cartridge including a non-volatile memory has a memory access controlling section for controlling data transmissions and receptions between a control section of a recording apparatus main body and a non-volatile memory based on commands supplied by the control section of the recording apparatus main body.

In the recording head apparatus according to the present invention, the memory access controlling section is thus provided in the carriage comprising the section for housing the recording material accommodating cartridge, thereby facilitating the provision of the memory access controlling section.

BRIEF DESCRIPTION OF THE DRAWINGS

FIG. 3 is a view useful in explaining information stored in the non-volatile memory;

FIG. 5 is a view useful in explaining an example of information stored in a non-volatile memory provided in a color ink cartridge;

FIG. 7 is a view useful in explaining the names of terminals (signal names) of an integrated circuit for a memory access controlling section and their functions;

FIG. 8 is a view useful in explaining various commands supplied by an apparatus main body controlling section;

FIG. 11 is a view useful in explaining the specifications of a variable-length command and of a response thereto;

FIG. 12 is a view useful in explaining the contents of a group of control registers and their functions;

FIG. 13 is a view useful in explaining information stored in a RAM;

FIG. 15 is a view useful in explaining a format of serial communication data;

BEST MODE FOR CARRYING OUT THE INVENTION

Embodiments of the present invention will be described below with reference to the accompanying drawings.

Figure 1:
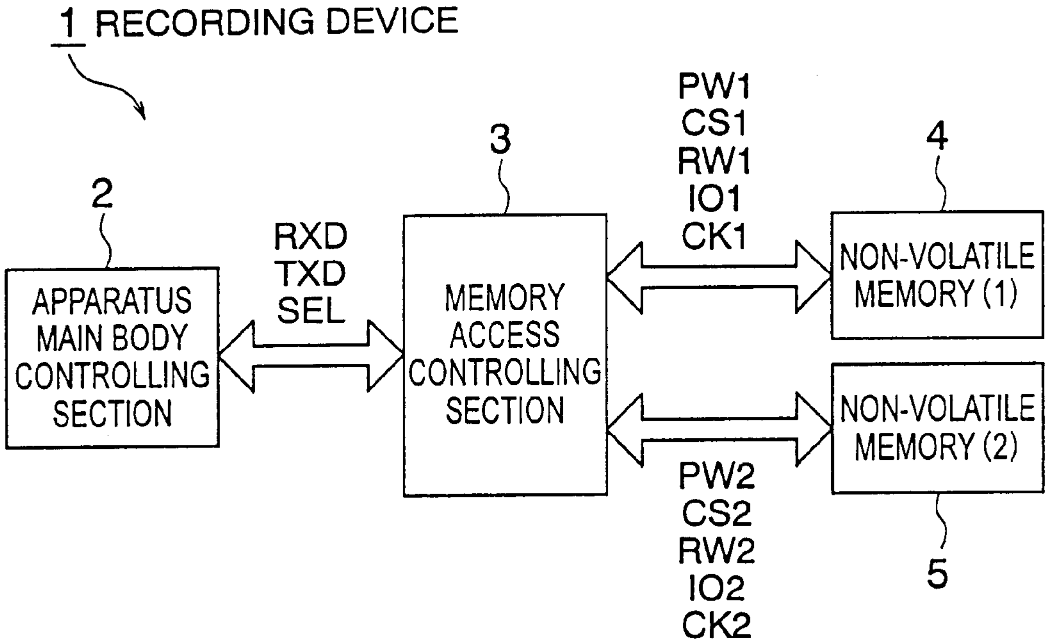
FIG. 1 is a block diagram showing the entire configuration of a recording apparatus according to the present invention.

FIG. 1 is a block diagram showing the entire configuration of a recording apparatus according to the present invention. A recording apparatus 1 is composed of an apparatus main body controlling section 2 provided in a recording apparatus main body, a memory access controlling section 3 provided in a carriage comprising an ink cartridge installing section, a non-volatile memory 4 provided in a black ink cartridge, a non-volatile memory 5 provided in a color ink cartridge, and a recording controlling mechanism (not shown; a mechanism for controlling sheet feeding, carriage movement, ink ejection, and the like). The non-volatile memories 4 and 5 are, for example, EEPROMs that allow electric writes thereto and electric readouts therefrom. Although FIG. 1 shows a configuration comprising the two non-volatile memories 4 and 5, any number of non-volatile memories may be used.

The apparatus main body controlling section 2 controls the entire operation of the recording apparatus 1 and comprises a microcomputer system. Various commands and data are transmitted and received between the apparatus main body controlling section 2 and the memory access controlling section 3 by means of serial data communication. The non-volatile memories 4 and 5 are of what is called a bit sequential access type that allows data to be written thereto and read out therefrom in a bit serial manner. The memory access controlling section 3 stores data read out from the non-volatile memory 4 or 5 in a RAM in the memory access controlling section 3.

The apparatus main body controlling section 2 issues a readout command to the RAM in the memory access controlling section 3 to read out various data therefrom. The apparatus main body controlling section 2 issues a write command to the RAM in the memory access controlling section 3 to write various data thereto. The apparatus main body controlling section 2 issues a command for a write to the non-volatile memory, to the memory access controlling section 3 in order to store data stored in the RAM in the memory access controlling section 3, in the non-volatile memory 4 or 5.

Thus, the recording apparatus 1 according to the present invention has the memory access controlling section 3 between the apparatus main body controlling section 2 and the non-volatile memories 4 and 5 so that the memory accesses controlling section 3 can execute writes to and readouts from the non-volatile memories 4 and 5, thereby making it unnecessary for the apparatus main body controlling section 2 to directly access the non-volatile memories 4 and 5. Accordingly, the amount of processing to be executed by the apparatus main body controlling section 2 can be reduced. Further the memory access controlling section 3 reads out data stored in the non-volatile memories 4 and 5 and stores them in the RAM. In response to a readout request issued by the apparatus main body controlling section 2, data stored in the RAM are read out for a response, thereby enabling a fast response to the readout request.

Figure 2:
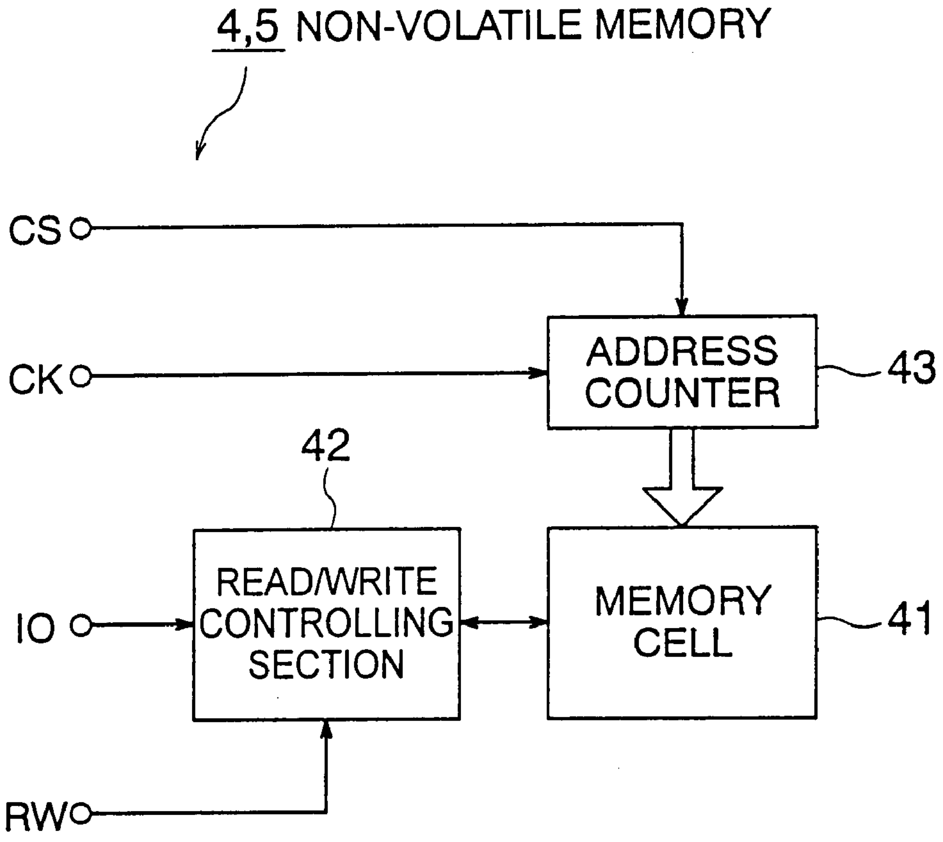
FIG. 2 is a block diagram showing a specific example of a non-volatile memory.

FIG. 2 is a block diagram showing a specific example of a non-volatile memory. The non-volatile memories 4 and 5 each comprise a memory cell 41, a read/write controlling section 42 and an address counter 43. If a chip select signal CS is at an L level, the address counter 43 is reset and has a count value of zero. If the chip select signal CS is at an H level, the address counter 43 performs an up-count operation based on a clock signal CK. Accordingly, when the chip select signal CS is changed to the H level, the address 0 is set, and whenever the clock signal CK is supplied, the address can be incremented. If a read/write signal WR is at the L level, the read/write controlling section 42 reads out data (1 bit) stored in the memory cell 41 at an address designated by the address counter 43 and outputs the readout data to a data I/O terminal IO. If the read/write signal WR is at the H level, the read/write controlling section 42 writes data (1 bit) supplied to the data I/O terminal IO to the memory cell 41 at the address designated by the address counter 43.

FIG. 3 is a view useful in explaining information stored in the non-volatile memory. The non-volatile memories 4 and 5 in this embodiment has a storage capacity of 256 bits. The non-volatile memories 4 and 5 each store 35 information items. Each information item has a variable bit length. The non-volatile memories 4 and 5 each store data of a variable length in a bit serial manner. This makes it possible to store a large amount of information in a limited storage capacity.

Data on the amount of remaining ink, data on the use start years and months of ink cartridges, that is, data that must be renewed depending on the usage of the ink cartridges are stored within the range of numbers 1 to 9 (information numbers 0 to 8 and 35 to 43) shown in FIG. 3. Thus, when the ink cartridges are actually used, data must be written (renewed) only to the lower addresses in the non-volatile memories 4 and 5. Accordingly, when the use of the recording apparatus 1 is ended and a power supply thereto is turned off, data within the range of numbers 1 to 9 (information numbers 0 to 8 and 35 to 43) have only to be written to the non-volatile memories 4 and 5.

The non-volatile memory 4 provided in the black ink cartridge stores data on the amount of remaining black ink, the use start year and month, and the like. The non-volatile memory 5 provided in the color ink cartridge stores data on the amount of remaining ink, the use start year and month, and the like for each color ink.

Various data that are not required to be renewed by the user are stored within the range of numbers 10 to 35 (information numbers 9 to 34 and 44 to 69) shown in FIG. 3. Specifically, these data include data on the versions of the ink cartridges, ink types, the date of manufacture (year, month, and day) of the ink cartridges, the serial numbers thereof, manufacturing sites, recycling of the cartridges, etc.

Figure 4:
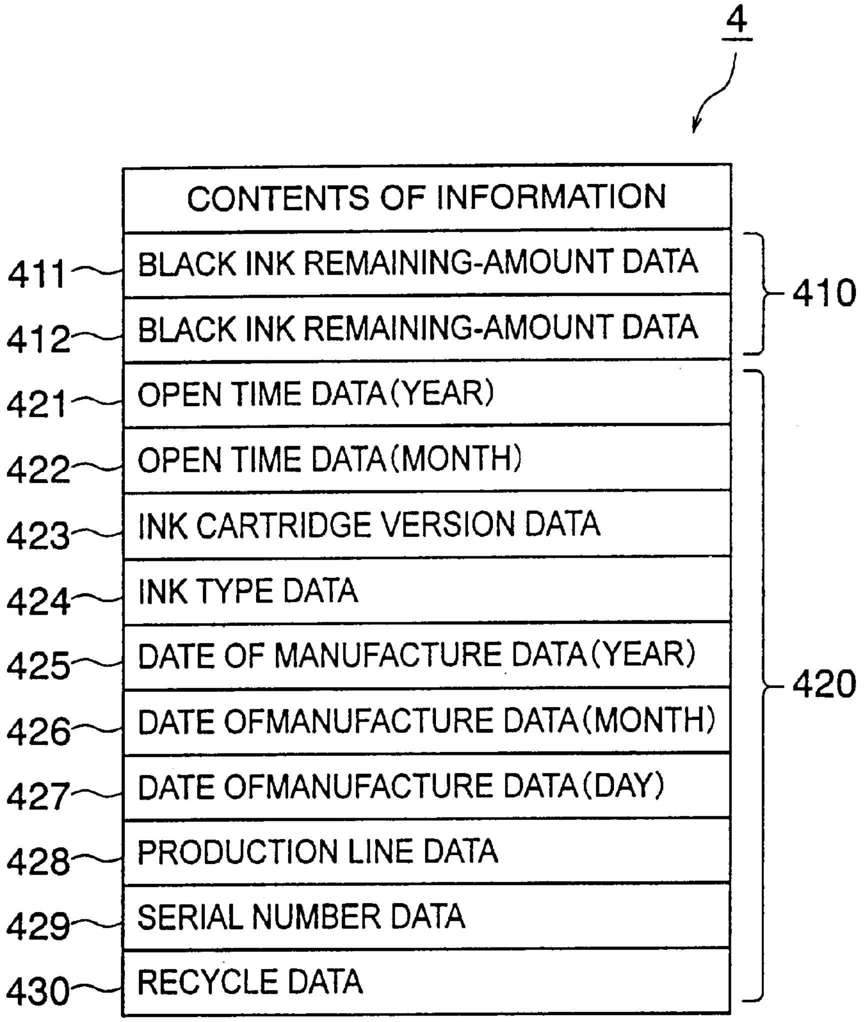
FIG. 4 is a view useful in explaining an example of information stored in a non-volatile memory provided in a black ink cartridge.

FIG. 4 is a view useful in explaining an example of information stored in the non-volatile memory provided in the black ink cartridge. In FIG. 4, reference numeral 410 denotes a first storage area in which data for rewrite are stored, and reference numeral 420 denotes a second storage area in which readout only data are stored. The first storage area 410 are arranged at addresses that are accessed earlier than the second storage area 420 when the non-volatile memory 4 is accessed.

The data for rewrite stored in the first storage area 410 are first and second black ink remaining-amount data assigned to storage areas 411 and 412, respectively, in terms of an access order. The black ink remaining amount data are assigned to the two storage areas 411 and 412 because the data in these areas are alternately rewritten. Thus, the data stored in the storage area 411 are the last rewritten data, the black ink remaining-amount data stored in the storage area 412 precede the last rewritten data and the data in the storage area 412 is to be written next.

The readout only data stored in the second storage area 420 are those on the opening times (year and month) of the ink cartridges, the versions of the ink cartridges, ink types such as pigments and dyes, the date of manufacture (year, month, and day) thereof, the production lines therefor, the serial numbers thereof, and the presence of recycling indicating whether the ink cartridge is new or recycled, which data are assigned to storage areas 412 to 430 in terms of an access order.

FIG. 5 is a view useful in explaining an example of information stored in the non-volatile memory provided in the color ink cartridge. In FIG. 5, reference numeral 510 denotes a first storage area in which data for rewrite are stored, and reference numeral 550 denotes a second storage area in which readout only data are stored. The first storage area 510 are arranged at addresses that are accessed earlier than the second storage area 550 when the non-volatile memory 5 is accessed.

The data for rewrite stored in the first storage area 510 are first and second cyan ink remaining-amount data, first and second magenta ink remaining-amount data, first and second yellow ink remaining-amount data, first and second light cyan ink remaining-amount data, and first and second light magenta ink remaining-amount data which are assigned to storage areas 511 to 520, respectively, in terms of an access order. The ink remaining amount data for each color are assigned to the two storage areas because the data in these areas are alternately rewritten as in the black ink cartridge.

The readout only data stored in the second storage area 550 are those on the opening times (year and month) of the ink cartridges, the versions of the ink cartridges, ink types such as pigments and dyes, the date of manufacture (year, month, and day) thereof, the production lines therefor, the serial numbers thereof, and the presence of recycling indicating whether the ink cartridge is new or recycled, which data are assigned to storage areas 551 to 560 in terms of an access order. Since these data are the same regardless of the colors, only the data for one color are stored as data common to all the colors.

Figure 6:
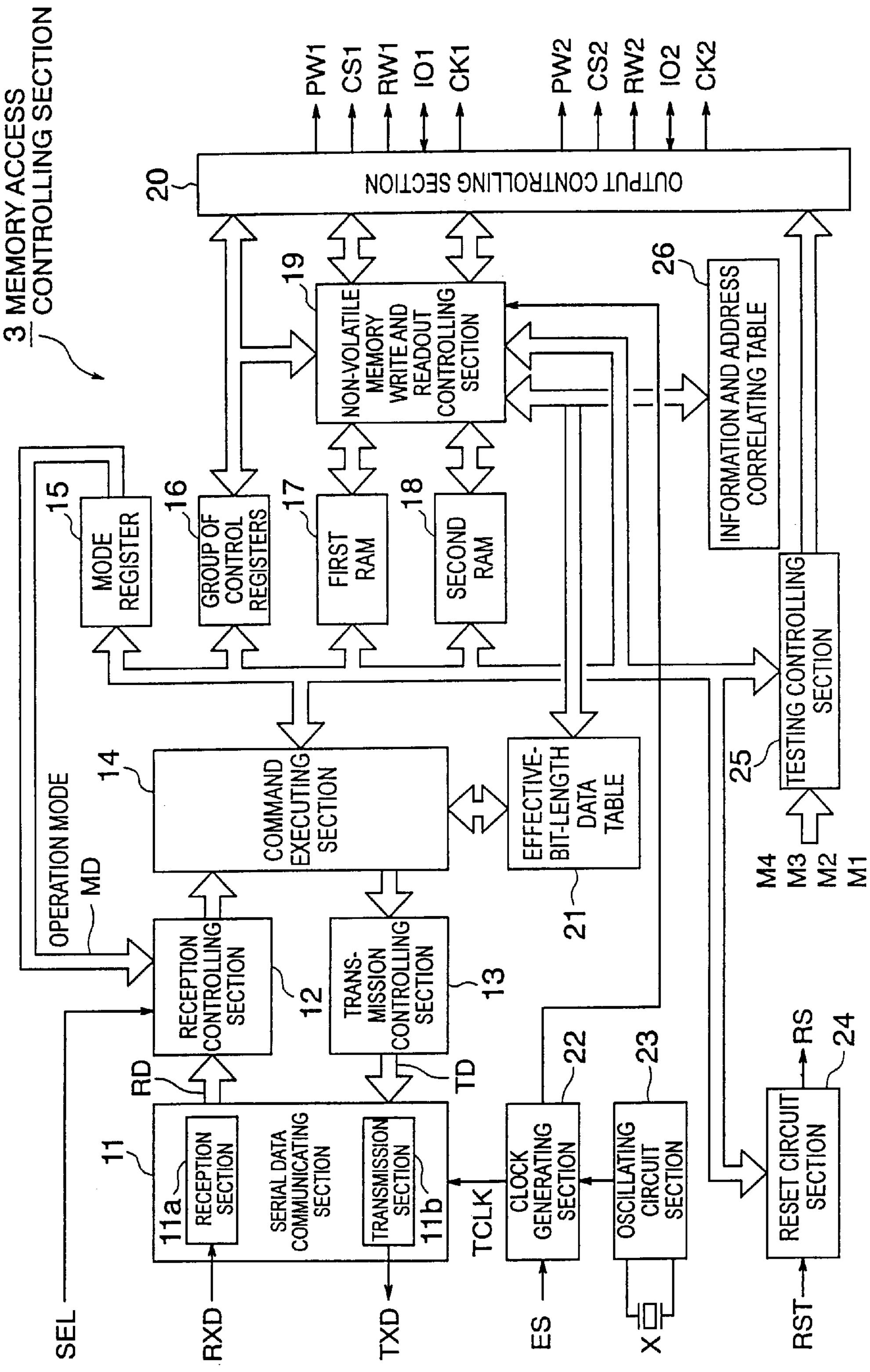
FIG. 6 is a block diagram showing a specific example of a memory access controlling section.

FIG. 6 is a block diagram showing a specific example of the memory access controlling section. The memory access controlling section 3 is composed of a serial-data communicating section 11, a reception controlling section 12, a transmission controlling section 13, a command executing section 14, a mode register 15, a group of control registers 16, a first RAM 17, a second RAM 18, a non-volatile memory write and read controlling section 19, an output controlling section 20, an effective-bit length data table 21, a clock generating section 22, an oscillation circuit section 23, a reset circuit section 24, a testing control section 25, and an information and address correlating table 26.

In this embodiment, the memory access controlling section 3 is implemented as an integrated circuit (semiconductor device) of one chip using a CMOS gate array. The memory access controlling section 3 may comprise program control using a one-chip microcomputer having a serial communication function built thereinto.

FIG. 7 is a view useful in explaining the names of terminals (signal names) of the integrated circuit for the access controlling section and their functions. Reference RXD denotes an input terminal for a serial data signal supplied by the apparatus main body controlling section 2. Reference SEL denotes an input terminal for a command mode designating signal (command selecting signal) supplied by the apparatus main body controlling section 2. Reference TXD denotes an output terminal for a serial data signal supplied to the apparatus main body controlling section 2. Reference CS1 denotes an output terminal for a selection signal (chip enable signal) for the first non-volatile memory and reference CS2 denotes an output terminal for a selection signal (chip enable signal) for the second non-volatile memory. Reference IO1 denotes an I/O terminal of the first non-volatile memory, and reference IO2 denotes an I/O terminal of the second non-volatile memory. Reference RW1 denotes an output terminal for a readout/write signal for the first non-volatile memory, and reference RW2 denotes an output terminal for a readout/write signal for the second non-volatile memory. Reference CK1 is an output terminal for a clock signal for the first non-volatile memory, and reference CK2 is an output terminal for a clock signal for the second non-volatile memory. Reference PW1 denotes a power supply terminal for the first non-volatile memory, and reference PW2 denotes a power supply terminal for the second non-volatile memory. References OSC1 and OSC2 denote connection terminals for a ceramic oscillator, a crystal vibrator, and the like. Reference RST denotes an input terminals for an initial reset signal. Reference ES denotes an input terminal for selecting a write time for the non-volatile memory. References M1 to M4 denote input terminals for a testing signal for selecting a monitor output. Reference VCC1 denotes a +5-V power supply terminal, reference VCC2 denotes a +3.3-V power supply terminal, and reference VSS denotes a ground (GND) terminal.

The symbols shown in the I/O column in FIG. 7 have the following meanings: Reference IN denotes an input, reference OUT denotes an output, and reference Tri denotes a tristate-side output. The initial-value column indicates logical levels obtained when this memory access controlling section integrated circuit is initially reset. Further, the items enclosed by the parentheses in the initial-value column indicate the level of each output terminal obtained immediately after the outputs to the non-volatile memory have been activated following the setting of an access permission in a non-volatile memory access permission setting register, described later. Reference H denotes a high level, reference L denotes a low level, and reference HiZ denotes a high impedance state.

Three signal lines connect the memory access controlling section 3 to the apparatus main body controlling section 2 (see FIG. 1) as shown in FIG. 6. Reference RXD denotes received data (data transmitted from the apparatus main body controlling section 2), reference TXD denotes transmitted data (data received by the apparatus main body controlling section 2), and reference SEL denotes a command mode designating signal whether a command transmitted by the apparatus main body controlling section 2 has a fixed or a variable length. The L level of the command mode designating signal SEL indicates an 8-bit fixed length command, whereas its H level indicates a variable-length command.

The serial data communicating method comprises a UART (Universal Asynchronous Receiver Transmitter) method. The data length is 8 bits, the start bit length is 1 bit, the stop bit length is 1 bit, and no parity bit is used. Data are transferred from an LSB (Least Significant Bit) to an MSB (Most Significant Bit). The baud rate is 125 kbps.

A reception section 11*a* in the serial-data communicating section 11 monitors the logical level of the received data RXD with a 0.5-microsecond cycle based on the clock TCLK of 2 MHz frequency supplied by the clock generating section 22. Thus, one-bit data undergo 16 level detections. Upon recognizing the start bit based on the fact that the logical level of the received data RXD changes from H level to L level, the reception section 11*a* repeats sampling the logical level of the received data RXD with a 16-clock cycle starting from the eighth clock TCLK from the point at which the start bit has been recognized. This allows the logical level of the received data RXD to be sampled substantially at the middle of each bit.

After the start bit has been recognized, if the logical level of the received data RXD returns to H at the next clock, the reception section 11*a* considers the previously detected L level as noise to restart an operation of detecting the start bit. Further, if the logical level of the start bit sampled at the eighth clock TCLK from the point at which the start bit has been recognized is not L, the reception section 11*a* aborts subsequent data sampling and resumes the start bit detecting operation. Furthermore, if the sampling level of the stop bit is not H, the reception section 11*a* invalidates all the sampled data. This prevents reception of abnormal data resulting from different baud rates between the transmitting side and the receiving side or from other factors. Upon normally receiving all of the start bit, 8-bit data, and stop bit, the reception section 11*a* converts the received serial 8-bit data into parallel data and outputs them to the reception controlling section 12 as parallel received data RD.

A transmission section 11*b* in the serial data communicating section 11 converts parallel transmitted data TD supplied by the transmission controlling section 13, into serial data, adds the start bit and the stop bit to the serial data to generate the transmitted data TXD, and transmits the generated transmitted data TXD at a predetermined baud rate.

FIG. 8 is a view useful in explaining various commands supplied by the apparatus main body controlling section. FIG. 8(*a*) shows an 8-bit fixed length command supplied by the apparatus main body controlling section when the command mode designating signal SEL has the L level. There are three types of 8-bit fixed length commands: a power-off process command, an initialization command, and a mode setting command. The power-off process command requests in power-off the recording apparatus 1 that various data stored in the RAM 17 or 18 are written to the non-volatile memory 4 or 5 and that after the write has been completed, all outputs to the non-volatile memories 4 and 5 are initialized to their reset states established immediately after power-on. The initialization command requests that all the circuits in the memory access controlling section 3 are initialized to its reset state established immediately after power-on. The mode setting command sets an operation mode used when the command mode designating signal SEL has become the H level. The mode setting command designates the operation mode with the 4 least significant bits. For example, if the 4 least significant bits are 0010, an operation mode 2 has been set.

The apparatus main body controlling section 2 is adapted to use 4-bit mode information to manage a plurality of operation modes ranging from modes 0 to 15. For example, the entire operation of the recording apparatus are commonly controlled in the mode 0, and print data are controlled in the mode 1. In the mode 2, the non-volatile memories 4 and 5 can each be accessed via the memory access controlling section. In the mode 3, a head sensor system is controlled. Even if data transmitted from the apparatus main body controlling section 2 are supplied to a plurality of control sections (for example, an ink ejection controlling section, a carriage movement controlling section, and a sheet feed controlling section), designation of an operation mode allows only the control section compatible with this operation mode to operate based on the data transmitted from the apparatus main body controlling section 2.

In this embodiment, the memory access controlling section 3 is adapted to access the two non-volatile memories 4 and 5. Thus, if a plurality of memory access controlling sections 3 are provided and assigned with different operation modes, a large number of non-volatile memories can be accessed.

Even if, for example, independent cartridges are provided for inks such as cyan, light cyan, magenta, light magenta, yellow, and black and each comprise a non-volatile memory, then, for example, six non-volatile memories can be accessed by using, for example, three memory access controlling sections 3. Thus, it will be easy to expand the construction of the recording apparatus by using the operation mode.

FIG. 8(*b*) shows a variable-length command supplied by the apparatus main body controlling section when the command mode designating signal SEL has the H level. The variable-length command comprises a plurality of bytes. In the first byte, the 4 most significant bits designate the operation mode and the 4 least significant bits designate the byte length of this command. The operation mode 2 (0010) is essentially set for commands to the memory access controlling section 3. The byte length in the 4 least significant bits contains data representative of the byte lengths of the second subsequent bytes (data representative of the byte lengths of the succeeding bytes exclusive of the first byte).

In the second byte, the 4 most significant bits designate a command, and the 4 least significant bits designate a data length. If the 4 most significant bits of the second byte is 0000, this represents a command for a data readout; if it is 1000, this represents a command for a data write. The 4 least significant bits of the second byte contain data indicating the byte length of write data supplied after address data if the command requires a data write, or contain data indicating the byte length of readout data if the command requires a data readout. In this embodiment, up to 4 bytes of data can be supplied with a single write request command.

The third and fourth bytes contain data indicating addresses to or from which data are to be written or read out. The figure shows that the third byte indicates the 8 least significant bits for the addresses, while the fourth byte indicates the 8 most significant bits for the addresses. This makes it possible to designate a wide address range with up to 16 bits. With regards to this, in this embodiment, the address range to and from which data are to be written or read out can be designated with an 8-bit address, so that only the 8 least significant bits of the address data are used. The designated address is an address in the RAMs and control registers (it is not an address in the non-volatile memories)

The fifth and subsequent bytes contain write data. The data contained in the fifth byte are written to the address indicated by the address data, and the data contained in the sixth and subsequent bytes are written to corresponding incremented addresses starting with the one larger than the address indicated by the address data, by one.

Figure 9:
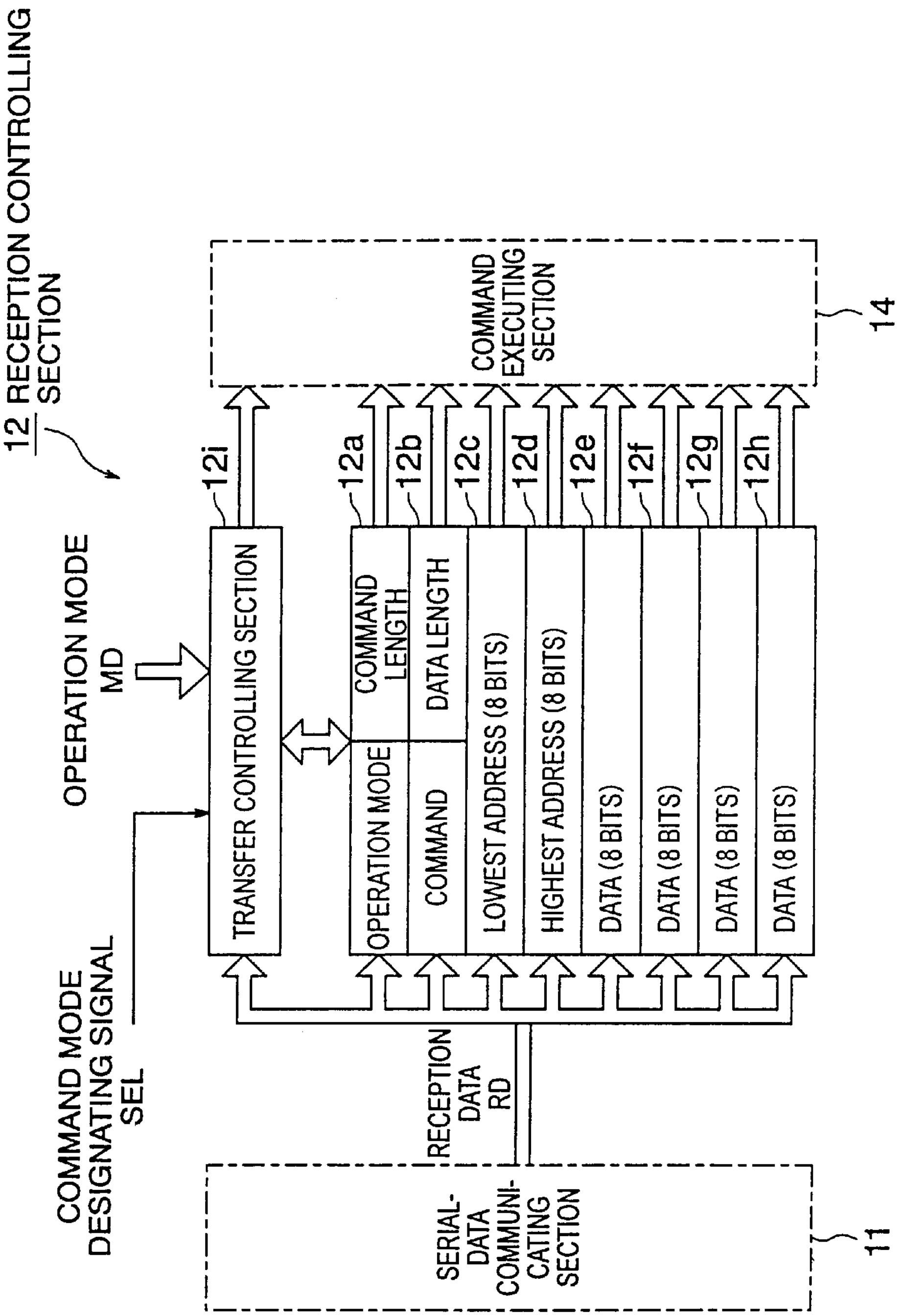
FIG. 9 is a block diagram of a reception controlling section.

FIG. 9 is a block diagram of the reception controlling section. The reception controlling section 12 comprises data latch circuits 12*a* to 12*h* for latching the parallel 8-bit received data RD supplied by the serial data communicating section 11, and a transfer controlling section 12*i* for controlling the write of the received data RD to the data latch circuits 12*a* to 12*h* and the transfer thereof to the command executing section 14 based on the command mode designating signal SEL and the received data RD.

If the command mode designating signal SEL is at the L level (it is for an 8-bit fixed length command), the transfer controlling section 12*i* supplies the received data RD supplied by the serial-data communicating section 11 to the command executing section 14.

If the command mode designating signal SEL is at the H level (it is for a variable-length command), the transfer controlling section 12*i* stores the received data RD transferred from the serial-data communicating section 11, in the first data latch circuit 12*a*. The transfer controlling section 12*i* then recognizes the command length of the variable-length command based on the 4 least significant bits of the data stored in the first data latch circuit 12*a*. The transfer controlling section 12*i* sequentially stores the received data sequentially supplied by the serial-data communicating section 11, in the second to eighth data latch circuits 12*a* to 12*h*. Upon detecting that an amount of received data corresponding to the bytes indicated by the command length have been stored in the data latch circuits, the transfer controlling circuit 12*i* transfers the series of data stored in the data latch circuits to the command executing section 14 and then initializes each of the data latch circuits to allow for the storage of the next variable-length command.

The transfer controlling section 12*i* waits for the next received data to be supplied until data of the number of bytes indicated by the command length are received. If the command mode designating signal SEL becomes the L level before data of the number of bytes indicated by the command length are received, the transfer controlling section 12*i* initializes all the data stored in the data latch circuits to allow for the reception of the next command. Thus, even while transmitting the variable-length command, the apparatus main body controlling section 2 can cancel the variable-length command being transmitted, by changing the command mode designating signal SEL to the L level.

Figure 10:
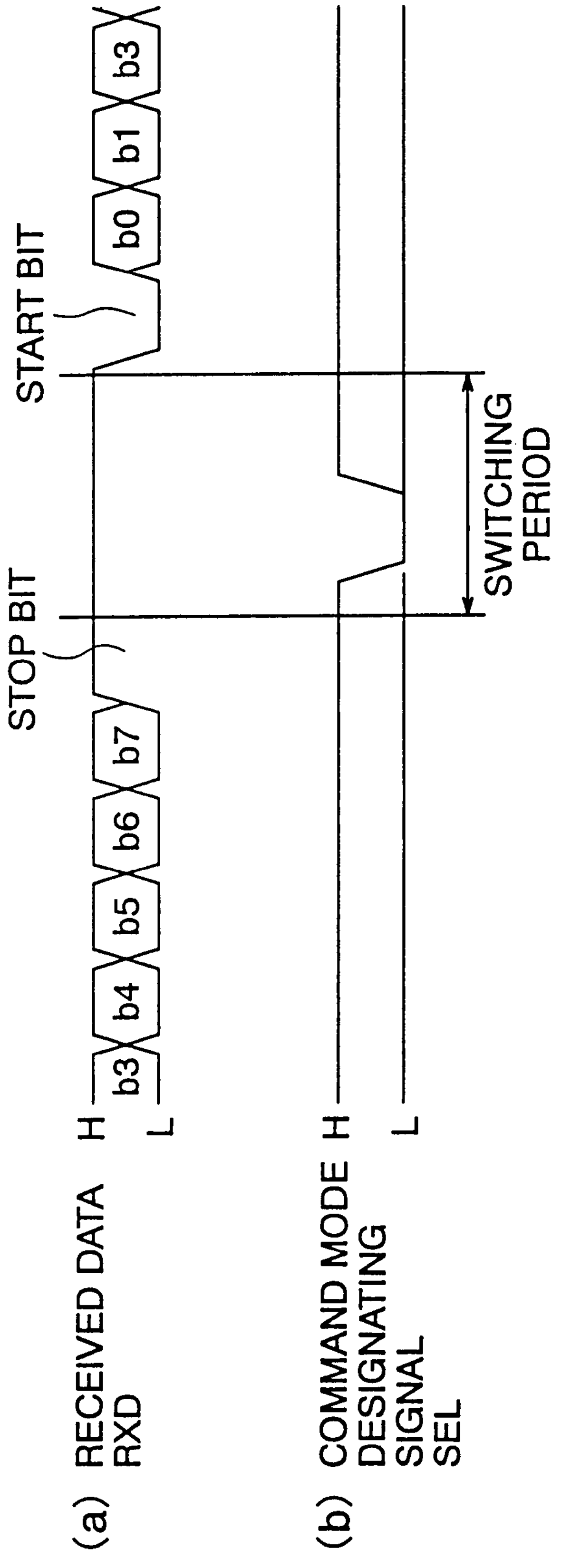
FIG. 10 is a view useful in explaining timings for switching a command mode designating signal.

FIG. 10 is a view useful in explaining timings for switching the command mode designating signal. FIG. 10(*a*) shows the received data RXD and FIG. 10(*b*) shows the command mode designating signal SEL. The apparatus main body controlling section 2 switches the logical level of the command mode designating signal SEL between the stop bit and the next start bit.

The transfer controlling section 12*i* shown in FIG. 9 gives top priority to the designation with the command length if the number of bytes indicated by the command length is unequal to that indicated by the data length. If, for example, the command length indicates a series of 5-byte data, while the data length indicates 4 bytes as the number of data bytes, the transfer controlling section 12*i* determines that all of the series of variable-length commands have been received when 2 bytes of data have been stored in each of the fifth and sixth data latch circuits 12*e* and 12*f*. The transfer controlling section 12*i* then transfers the data stored in the data latch circuits to the command executing section 14 to allow for the storage of the next command.

If a mode register, described later, is set to the operation mode 2, the transfer controlling section 12*i* gives top priority to the designation for the operation mode 2 set in the mode register and accepts any command as one for the operation mode 2 (in other words, as a command to the memory access controlling section) even if the operation mode (the designation with the 4 most significant bits of the received data stored in the first data latch circuit 12*a*) supplied via the serial-data communicating section 11 indicates an operation mode other than the operation mode 2.

In this embodiment, three types of data lengths including 1 byte, 2 bytes, and 4 bytes can be set and the data length can be set with 4-bit data. Thus, if data indicating a data length other than these three types, the data length is determined to be designated as 4 bytes. Specifically, if data indicating a data length of 3 bytes or 5 to 15 bytes, the transfer controlling section 12*i* determines that the data length is 4 bytes.

Further, in this embodiment, each address in the RAMs 17 and 18 and the control register 16 can be designated with 8 bits. Thus, the address can be designated only with the lowest address stored in the third data latch circuit 12*c*. Thus, the data on the highest address stored in the fourth data latch circuit 12*d* are not required to be transferred to the command executing section 14. Moreover, the fourth data latch circuit 12*d* is not required to be provided. In this case, the transfer controlling section 12*i* discards the received data on the highest address supplied by the serial-data communicating section 11 and stores data supplied next to the highest address in the fifth data latch circuit 12*e*.

When supplied with a command received from the reception controlling section 12, the command executing section 14 shown in FIG. 6 interprets and executes that command. When supplied with the mode set command, the command executing section 14 writes data for the operation mode indicated by the mode set command, to the mode register 15. In this case, the 4-bit data 0010 indicative of a memory access controlling operation mode are written to the mode register 15. The operation mode MD set in the mode register 15 is supplied to the reception controlling section 12.

When supplied with the initialization command, the command executing section 14 supplies a reset signal generation request to the reset circuit section 24 to generate a reset signal RS. This initializes (resets) each of the circuit sections of the memory access controlling section 3.

If the variable-length command is transferred from the reception controlling section 12, the command executing section 14 interprets the contents of the variable-length command and executes a process such as a write to or a readout from the group of control registers 16, the first RAM 17, or the second RAM 18.

FIG. 11 is a view useful in explaining the specifications of the variable-length command and of a response thereto. This figure shows the specification of the variable-length command (request) in a section (a). The variable-length command includes a readout command (READ) and a write command (WRITE) The mode is set at the 4-bit value (0010), indicating the operation mode 2.

The command length indicates the byte length of the command with 4 bits. The 4-bit command value 0000 indicates the readout command, whereas the 4-bit command value 1000 indicates the write command. The data length designates the number of bytes of data for readout and write. The data length can be set to 1 byte, 2 bytes, and 4 bytes. Zero byte, 3 bytes, and 5 to 15 bytes are prohibited from being set. The address comprises 16 bits and is designated as 8 least significant bits and 8 most significant bits as shown in FIG. 8. This embodiment uses only the 8 least significant bits. For the write command (WRITE), data to be written are set to comprise sets of 8 bits (bytes).

The section (b) in FIG. 11 indicates the specification of a response to the read command. The mode is set to the 4-bit value (0010), designating the operation mode 2. The data length designates the number of bytes of data as a response based on the read command. The data length can be set to 1 byte, 2 bytes, and 4 bytes. Zero byte, 3 bytes, and 5 to 15 bytes are prohibited from being set. Data to be provided as a response are set to comprise sets of 8 bits (bytes).

FIG. 12 is a view useful in explaining the contents of the group of control registers and their functions. The group of control registers 16 comprises a plurality of registers. The group of control registers 16 are assigned with addresses 80 to 92 in the hexadecimal notation.

The address 80 (hexadecimal notation) corresponds to a non-volatile memory access permission setting register in which 2-bit data are set. Each non-volatile memory (each cartridge) is assigned with one bit. The least significant bit is set to indicate whether an access to the first non-volatile memory is permitted, and the most significant bit is set to indicate whether an access to the second non-volatile memory is permitted.

The bit value of 0 prohibits the access to the non-volatile memory. In this case, the terminals are set by the output controlling section 20 as follows: The power supply terminals PW1 and PW2 are in an off state where no power is supplied to the non-volatile memories, and the chip select signal output terminals CS1 and CS2, the clock supply terminals CK1 and CK2, the read/write signal output terminals RW1 and RW2, and the data I/O terminals IO1 and IO2 are all in a high impedance state.

The bit value of 1 causes the output controlling section 20 to set the power supply terminals PW1 and PW2 in an on state where power is supplied to the non-volatile memories. The chip select signal output terminals CS1 and CS2, the clock supply terminals CK1 and CK2, the read/write signal output terminals RW1 and RW2, and the data I/O terminals IO1 and IO2 are all set in a controllable (active) state by the non-volatile memory write and read controlling section 19.

The address 84 (hexadecimal notation) corresponds to a non-volatile memory readout permission setting register in which 2-bit data are set. Each non-volatile memory (each cartridge) is assigned with one bit. The least significant bit is set to indicate whether a readout from the first non-volatile memory is permitted, and the most significant bit is set to indicate whether a readout from the second non-volatile memory is permitted. The bit value of 0 prohibits the readout, whereas the bit value of 1 permits the readout.

The address 85 (hexadecimal notation) corresponds to a non-volatile memory all-area readout setting register. When arbitrary data are written to the non-volatile memory all-area readout setting register (the apparatus main body controlling section 2 issues a write command indicating an address in the non-volatile memory all-area readout setting register), all the data stored in the non-volatile memories can be read out via the non-volatile memory write and readout controlling section 19. However, the access to the non-volatile memories must be permitted beforehand and the permission for the readout must be set beforehand.

The address 86 (hexadecimal notation) corresponds to an area storing an all-area readout busy flag indicating that data are being read out from all the areas. The non-volatile memory write and readout controlling section 19 sets the all-area readout busy flag to one before an all-area readout operation is started, and sets this flag to zero when the all-area readout operation is completed.

The address 88 (hexadecimal notation) corresponds to a non-volatile memory all-area write permission setting register in which 2-bit data are set. Each non-volatile memory (each cartridge) is assigned with one bit. The least significant bit is set to indicate whether an all-area write to the first non-volatile memory is permitted, and the most significant bit is set to indicate whether an all-area write to the second non-volatile memory is permitted. The bit value of 0 prohibits the write, whereas the bit value of 1 permits the write.

The address 89 (hexadecimal notation) corresponds to a non-volatile memory all-area write setting register. When arbitrary data are written to the non-volatile memory all-area write setting register (a write operation is performed on the non-volatile memory all-area write setting register), data can be written to all the areas of the non-volatile memories via the non-volatile memory write and readout controlling section 19. However, the access to the non-volatile memories must be permitted beforehand and the permission for the all-area write must be set beforehand.

The address 8A (hexadecimal notation) corresponds to an area storing an all-area write busy flag indicating that data are being written to all the areas. The non-volatile memory write and readout controlling section 19 sets the all-area write busy flag to one before an all-area write operation is started, and sets this flag to zero when the all-area write operation is completed.

The address 8C (hexadecimal notation) corresponds to a non-volatile memory limited write permission setting register in which 2-bit data are set. Each non-volatile memory (each cartridge) is assigned with one bit. The least significant bit is set to indicate whether a limited write to the first non-volatile memory is permitted, and the most significant bit is set to indicate whether a limited write to the second non-volatile memory is permitted. The bit value of 0 prohibits the limited write, whereas the bit value of 1 permits the limited write.

The address 8D (hexadecimal notation) corresponds to a non-volatile memory limited write setting register. When arbitrary data are written to the non-volatile memory limited write setting register (a write operation is performed on the non-volatile memory limited write setting register), data can be written to limited areas of the non-volatile memories via the non-volatile memory write and readout controlling section 19. However, the access to the non-volatile memories must be permitted beforehand and the permission for the limited write must be set beforehand.

The address 8E (hexadecimal notation) corresponds to an area storing a limited write busy flag indicating that a limited write is being executed. The non-volatile memory write and readout controlling section 19 sets the limited write busy flag to one before a limited write operation is started, and sets this flag to zero when the limited write operation is completed.

The address 90 (hexadecimal notation) corresponds to a power-off write permission setting register in which 2-bit data are set. Each non-volatile memory (each cartridge) is assigned with one bit. The least significant bit is set to indicate whether a power-off write to the first non-volatile memory is permitted, and the most significant bit is set to indicate whether a power-off write to the second non-volatile memory is permitted. The bit value of 0 prohibits the power-off write, whereas the bit value of 1 permits the power-off write.

The address 92 (hexadecimal notation) corresponds to an area storing a power-off write busy flag indicating that a power-off write is being executed. The non-volatile memory write and readout controlling section 19 sets the power-off write busy flag to one before a power-off write operation is started, and sets this flag to zero when the power-off write operation is completed. Further, the non-volatile memory write and readout controlling section 19 sets the contents of the non-volatile memory access permission setting register to initial values (all bits to zero) when the power-off write operation is completed.

The power-off write is executed based on the power-off process command shown in FIG. 8(*a*). In the power-off write, data are written to over a limited address range from the leading address in the non-volatile memory to a preset predetermined address.

As described previously, data such as the amount of remaining ink, for example, which must be renewed depending on the usage of the recording apparatus are stored within the address range from the leading address in the non-volatile memory to the preset predetermined address. Further, data such as manufacturing conditions for the ink cartridges which are not required to be renewed by the user are stored after the predetermined address. Accordingly, if the recording apparatus is used by the user, data are renewed over the limited address range of the non-volatile memory.

FIG. 13 is a view useful in explaining information stored in the RAM. The RAMs 17 and 18 are configured to contain 8 bits×40 words. In this embodiment, the first RAM 17 is assigned with addresses 00 to 27 in the hexadecimal notation, while the second RAM 18 is assigned with addresses 40 to 67 in the hexadecimal notation.

The first RAM 17 is provided so as to correspond to the first non-volatile memory 4 provided in the black ink cartridge. Various information (information 0 to 34) stored in the first non-volatile memory 4 is read out via the non-volatile memory write and readout controlling section 19 and stored in the first RAM 17.

The second RAM 18 is provided so as to correspond to the second non-volatile memory 5 provided in the color ink cartridge. Various information (information 35 to 69) stored in the second non-volatile memory 5 is read out via the non-volatile memory write and readout controlling section 19 and stored in the second RAM 18.

There is registered beforehand in the effective-bit-length data table 21 shown in FIG. 6, the relationship between the information numbers of the information stored in the non-volatile memories and the number of data bits in the information. The effective-bit-length data table 21 also has correlation data between addresses in each of the group of control registers 16 and corresponding effective bit lengths registered therein beforehand. There are also registered beforehand in the effective-bit-length data table 21, correlation data between addresses in the RAMs 17 and 18 and effective bit lengths for data stored at these addresses.

There is registered in the information and address correlating table 26, the correlationship between information numbers and addresses in the RAM where the information is stored.

The non-volatile memory write and readout controlling section 19 identifies, for each information number, the data of a variable length and in bits which have been read out from the non-volatile memories 4 and 5, by referencing the effective-bit-length data table 21. Then, if the data corresponding to each information number have less than 8 bits, the non-volatile memory write and readout controlling section 19 adds zeros to the most significant bit to obtain 8-bit data. Further, if the data corresponding to each information number contain 9 bits or more, the non-volatile memory write and readout controlling section 19 separates the data into the 8 least significant bits and the remaining data, and if the remaining data contain less than 8 bits, the non-volatile memory write and readout controlling section 19 adds zeros to the most significant bit to obtain 8-bit data. The non-volatile memory write and readout controlling section 19 then references the information and address correlating table to write the information each composed of 8 bits to predetermined addresses in the RAMs 17 and 18.

To write the information stored in the RAMs 17 and 18 back to the non-volatile memories 4 and 5, the non-volatile memory write and readout controlling section 19 performs the readout operation in the reverse order to generate sequential data in bits and of a variable length.

The output controlling section 20 comprises tristate buffer circuits for driving the output terminals PW, CS, RW, and CK, a bidirectional buffer circuit connected to the IO terminal, circuits for controlling the output state of the tristate buffers, output signal switching circuits for switching an input signal to each buffer circuit between an access state where the non-volatile memories 4 and 5 can be accessed and a test mode, described later, and other circuits (none of these circuits are shown).

The tristate buffer circuit for driving the power supply terminals PW1 and PW2 has a high current driving capability. When the access permission setting register of the group of control registers 16 is set to the state where the access to the non-volatile memories is permitted, the tristate buffer circuit with a high current driving capability has its output driven to the H level to cause the power supply terminals PW1 and PW2 to supply power to the non-volatile memories 4 and 5.

The non-volatile memory write and readout controlling section 19 drives the terminals CS, RW, CK, and IO via the output controlling section 20 to access the non-volatile memories 4 and 5. To read information out from the non-volatile memory 4 or 5, the non-volatile memory write and readout controlling section 19 changes the chip select terminal CS from L level to H level to make the non-volatile memory 4 or 5 operative, and sets the read/write signal output terminal RW to the L level to set the non-volatile memory 4 or 5 in the readout mode. After the period of time required to establish a data output from the non-volatile memory 4 or 5 has passed, the non-volatile memory write and readout controlling section 19 loads the logical level of the data I/O terminal IO to read data out from the leading address in the non-volatile memory 4 or 5, supplies a clock for incrementing the address in the non-volatile memory, to the clock supply terminal CK to increment the address in the non-volatile memory, and then reads data out from the next address. This operation is repeated until the final address in the non-volatile memory, to read out all the data stored in the non-volatile memory.

To write information to the non-volatile memory, the non-volatile memory write and readout controlling section 19 changes the chip select terminal CS from L level to H level to make the non-volatile memory 4 or 5 operative, and sets the read/write signal output terminal RW to the H level to set the non-volatile memory 4 or 5 in the write mode. Then, while allowing write data (H or L level) to be output to the data I/O terminal IO, the non-volatile memory write and readout controlling section 19 changes the clock terminal CK from L level to H level. When the clock signal changes from L level to H level, the non-volatile memory 4 or 5 loads and stores the data at the leading address in a memory cell. Then, the non-volatile memory write and readout controlling section 19 changes the clock terminal CK from H level to L level to increment the address in the non-volatile memory 4 or 5. The non-volatile memory write and readout controlling section 19 then allows the outputting of data to be stored at the next address and changes the clock terminal CK from L level to H level to write the data to the next address. This operation is repeated until a predetermined address.

The non-volatile memory write and readout controlling section 19 comprises a circuit section for executing writes to and readouts from the first non-volatile memory and a circuit section for executing writes to and readouts from the second non-volatile memory, in order to simultaneously read out or write back information from or to the two non-volatile memories. This enables writes to and readouts from the non-volatile memories 4 and 5 to be performed in a short time.

When supplied with the variable-length command by the reception controlling section 12, the command executing section 14 determines whether the command is for a write or for a readout based on the command (4 most significant bits of the second byte) shown in FIG. 8(*b*). In this case, if the command composed of 4 bits have the data 0000, it is for a readout; if the command composed of 4 bits have the data 1000, it is for a write. If the command has data other than 0000 or 1000, the command executing section 14 discards the series of variable-length commands and waits for the next command to be transferred.

When supplied with the write request command, the command executing section 14 writes the first data (data indicated by the fifth byte of the variable-length command) to the address indicated by the lowest address. When supplied with the second data, the command executing section write the second data (data indicated by the sixth byte of the variable-length command) to the address larger than the one indicated by the lowest address, by one. When supplied with the third and fourth data, the command executing section write the third and fourth data (data indicated by the seventh and eighth bytes of the variable-length command) to the addresses larger than the one indicated by.the lowest address, by two and three, respectively.

In writing the data to the indicated address, the command executing section 14 references the effective-bit-length data table 21 to ascertain the effective bit length for the data to be stored at that address. If any bit beyond the effective bit length for the data supplied by the apparatus main body controlling section 2 has a value of 1, the command executing section 14 changes the value of this bit to zero before writing the changed data to the corresponding register. When supplied with a command for a write of the 8-bit data 11111111 to the access permission setting register corresponding to the address 80 (hexadecimal notation), the command executing section 14 ascertains that the effective bit length for the access permission setting register is 2 bits based on the effective-bit-length data table 21, changes the values of bits beyond the effective bit length to zero to generate data 00000011, and writes the generated data 00000011 to the access permission setting register corresponding to the address 80 (hexadecimal notation).

When supplied with the readout request command, the command executing section 14 recognizes the number of bytes of the readout request based on the data length (4 least significant bits of the second byte) shown in FIG. 8(*b*) If the readout request is for one byte, then based on the address indicated by the lowest address, the command executing section 14 reads out the data stored at this address. If the readout request is for two bytes, then the command executing section 14 reads data out from the address indicated by the lowest address and from the next address (the indicated address+1). If the readout request is for four bytes, then the command executing section 14 reads data out from the address indicated by the lowest address and from the addresses equaling the indicated one+1, the indicated one+2, and the indicated one+3.

The command executing section 14 supplies data on the byte length of the readout data to the transmission controlling section 13 and then supplies the actually readout data thereto.

Figure 14:
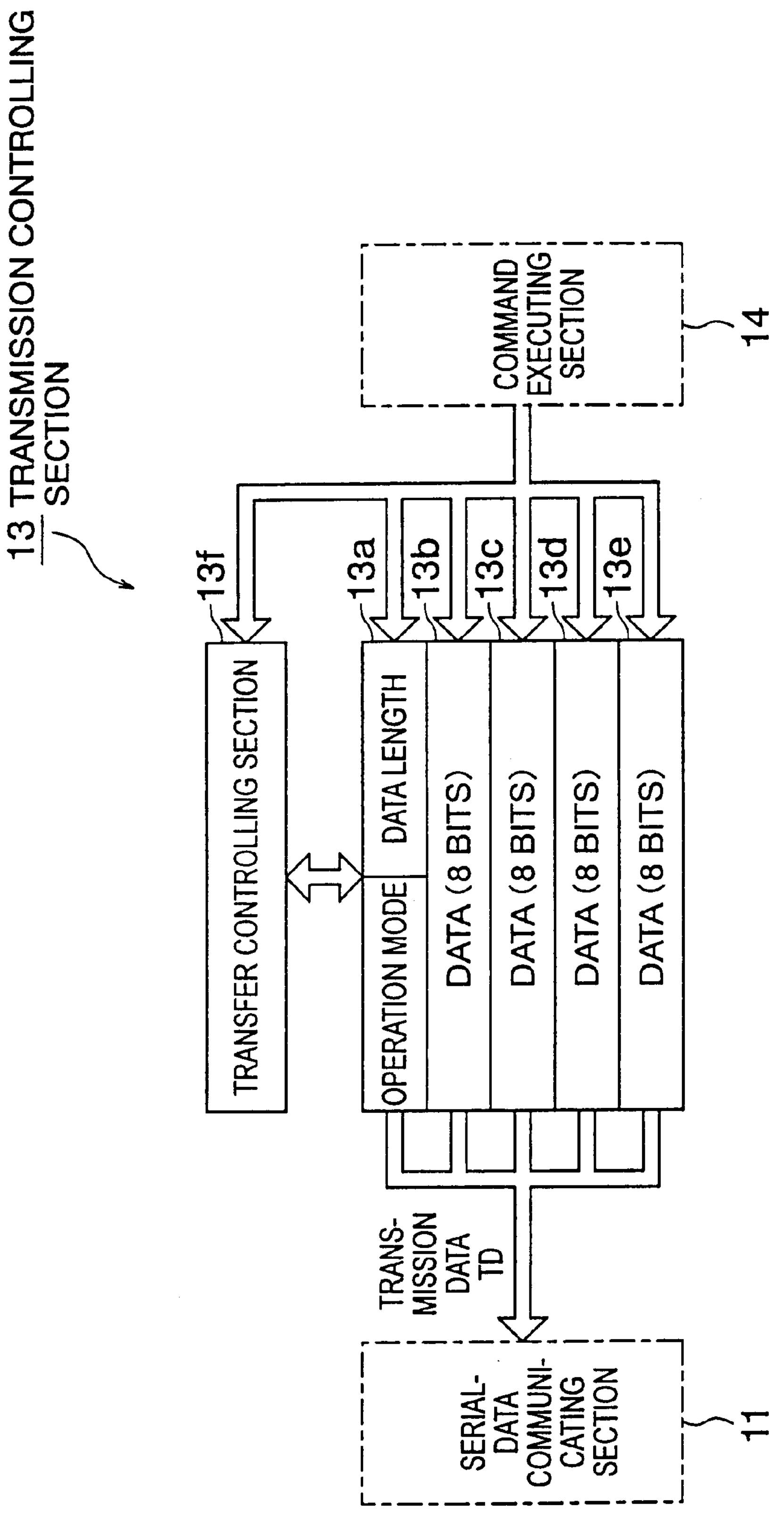
FIG. 14 is a block diagram of a transmission controlling section.

FIG. 14 is a block diagram of the transmission controlling section. The transmission controlling section 13 comprises five data latch circuits 13*a* to 13*e* and a transfer controlling section 13*f*. The transfer controlling section 13*f* causes the first data latch circuit 13*a* to store the operation mode (0010) in the 4 most significant bits and the data length (the byte length of the readout data) in the 4 least significant bits. The transfer controlling section 13*f* causes the second to fifth data latch circuits 13*b* to 13*f* to store the first to fourth readout data supplied by the command executing section 14. Upon ascertaining, based on the data on the data length, that a predetermined number of data have been obtained, the transfer controlling section 13*f* sequentially transfers the data stored in the data latch circuits 13*a* to 13*e* to the serial-data communicating section 11.

The transmission section 11*b* in the serial-data communicating section 11 shown in FIG. 6 converts the parallel transmitted data TD sequentially transferred from the transmission controlling section 13 into serial data and sequentially sends the resulting data to the apparatus main body controlling section 2, as described previously.

FIG. 15 is a view useful in explaining a format of serial communication data. FIG. 15(*a*) shows a format used to transmit data less than 8 bits. If 5-bit information is stored in the non-volatile memory as shown in FIG. 15(i), the data to be serially transmitted have zeros inserted into the 3 most significant bit positions as shown in FIG. 15(ii) and are transmitted as 1-byte (8-bit) data. In this manner, the data less than 1 byte are arranged at the least significant bit positions, with zeros placed in the most significant bit positions.

FIG. 15(*b*) shows a format used to transmits data more than 8 bits. If 10-bit information is stored in the non-volatile memory as shown in FIG. 15(iii), the 10-bit data are divided into 2-byte data sets for transmission as shown in FIG. 15(iv). Specifically, the 8least significant bits of the 10-bit data are first transmitted as the first byte. Then, the 2 most significant bits of the 10-bit data are arranged at the least significant bit positions and zeros are inserted into the most significant bit positions as dummy data to thereby convert the 10-bit data into 8-bit (1-byte) data, which are then transmitted as the second byte.

The reset circuit section 24 shown in FIG. 6 generates a reset signal RS if the logical level of the power-on reset signal RST is L. The circuit sections in the memory access controlling section 3 are initialized (reset) based on the reset signal RS. Further, when supplied with a reset signal generating signal by the command executing section 14, the reset circuit section 24 generates the reset signal RS. Thus, the apparatus main body controlling section 2 transmits the initialization command shown in FIG. 8(*a*) to initialize each of the circuit sections in the memory access controlling section 3.

The oscillating circuit section 23 comprises a crystal vibrator, a ceramic oscillator X, or the like to generate a raw clock signal of, for example, 16 MHz frequency. The clock generating section 22 divides the raw clock signal to obtain the clock signal TCLK of, for example, 2-MHz frequency. Further, the clock generating section 22 generates the clock signals CK1 and CK2 for the non-volatile memories 4 and 5. The clock signals CK1 and CK2 for the non-volatile memories 4 and 5 can have their frequencies switched between two levels depending on the logical level of a clock cycle selecting signal ES. This accommodates non-volatile memories with different write times.

The output controlling section 20 controls the states of the signal I/O terminals of the non-volatile memories 4 and 5 as described previously. The testing control section 25 tests the memory access controlling section 3 for operation. Normal operational conditions are established when 4-bit testing signals M1 to M4 are set to the L level. If other conditions are set, a test mode is entered, thereby making it possible to output the operational conditions of the internal circuit including the data in the registers and RAMs, to the terminals PW, CS, RW, IO, and CK and other terminals via the output controlling section 20. This facilitates checking of the operational conditions of the internal circuit.

Next, the operation of the above configuration will be explained. The apparatus main body controlling section 2 sets the command mode designating signal SEL to the L level and then transmits the initialization command. In receipt of the initialization command, the memory access controlling section 3 initializes the entire circuit to the same state as that established upon power-on. Then, the apparatus main body controlling section 2 transmits the mode setting command to cause the mode register 15 in the memory access controlling section 3 to set the operation mode 2. Thereafter, the apparatus main body controlling section 2 sets the command mode designating signal SEL to the H level.

After the operation mode 2 is set in the mode register 15 to set the command mode designating signal SEL to the H level, even if the operation mode in a command supplied by the apparatus main body controlling section 2 is not 2, the memory access controlling section 3 can accept that command as one for the operation mode 2.

The apparatus main body controlling section 2 sequentially issues write commands to set a value for each of the group of control registers 16 so that the memory access controlling section 3 can access the non-volatile memories 4 and 5. Then, the apparatus main body controlling section 2 issues a write command indicating addresses in the all-area readout controlling register. Thus, the non-volatile memory write and readout controlling section 19 reads the information stored in the non-volatile memories 4 and 5 and stores the readout information in the RAMs 17 and 18.

The information stored in the non-volatile memories 4 and 5 has different bit lengths for different pieces of information. The non-volatile memory write and readout controlling section 19 partitions the information by referencing the effective-bit-length data table 21 in which the contents shown in FIG. 3 are registered. The non-volatile memory write and readout controlling section 19 modifies data less than 8 bits to 8-bit data by adding zeros to the missing bits, and modifies data more than 8 bits to 2-byte data. The non-volatile memory write and readout controlling section 19 then stores the data composed of sets of 8 bits, at predetermined addresses in the RAMs 17 and 18 by referencing the information and address correlating table 26 in which the contents shown in FIG. 13 are registered. Thus, all the information stored in the first non-volatile memory 4 is stored in the first RAM 17, while all the information stored in the second non-volatile memory 5 is stored in the second RAM 18.

The apparatus main body controlling section 2 can obtain various information such as data on the amount of remaining ink, the use start year and month of the cartridges, and ink types, for example, by designating addresses in the RAMs 17 and 18 and issuing a readout request. The apparatus main body controlling section 2 can also ascertain the current set conditions by reading the contents out from the group of control registers 16.

The apparatus main body controlling section 2 manages the amount of ink which has been used in connection with the execution of print operations. The apparatus main body controlling section 2 issues a request for a write of data on the renewed amount of ink to renew the data in the RAMs 17 and 18 relating to the amount of remaining ink.

Before turning off the power supply to the recording apparatus, the apparatus main body controlling section 2 sets the command mode designating signal SEL to the L level and then transmits the power-off command. When supplied with the power-off command, the memory access controlling section 3 writes the data stored in the RAMs 17 and 18 back to the non-volatile memories 4 and 5. This causes the renewed data on the amount of remaining ink to be stored in the non-volatile memories 4 and 5. This write back to the non-volatile memories 4 and 5 based on the power-off command is directed only at information (numbers 1 to 9 shown in FIG. 3, specifically, data such as the amount of remaining ink which must be renewed by the user) set at lower addresses in the non-volatile memories 4 and 5. Accordingly, the write back to the non-volatile memories 4 and 5 can be completed in a short time, and no other data are rewritten.

The write back to the non-volatile memories 4 and 5 can also be executed by issuing from the apparatus main body controlling section 2 a command for a write of a command for permitting a limited write to a limited write permitting register shown in FIG. 12.

Figure 16:
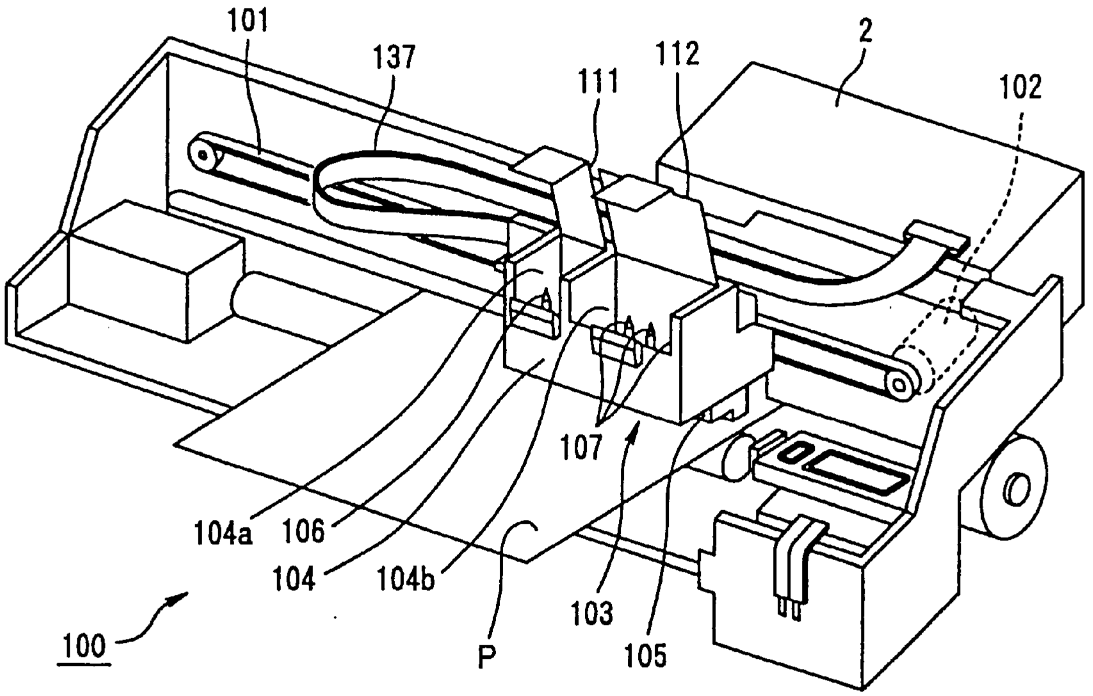
FIG. 16 is a perspective view showing the structure of a printing mechanism section of an ink jet printer with a recording apparatus according to the present invention applied thereto.

FIG. 16 is a perspective view showing the structure of a printing mechanism section of an ink jet printer with a recording apparatus according to the present invention applied thereto. The printing mechanism section 100 of the ink jet printer apparatus shown in FIG. 16 comprises a carriage 103 connected to a drive motor 102 via a timing belt 101 so as to reciprocate in a sheet width direction of recording paper P. The carriage 103 has a holder 104 formed therein and comprising black ink cartridge storage section 104*a* and a color ink cartridge storage section 104*b,* and has a recording head 105 on the underside of the carriage 103.

Figure 17:
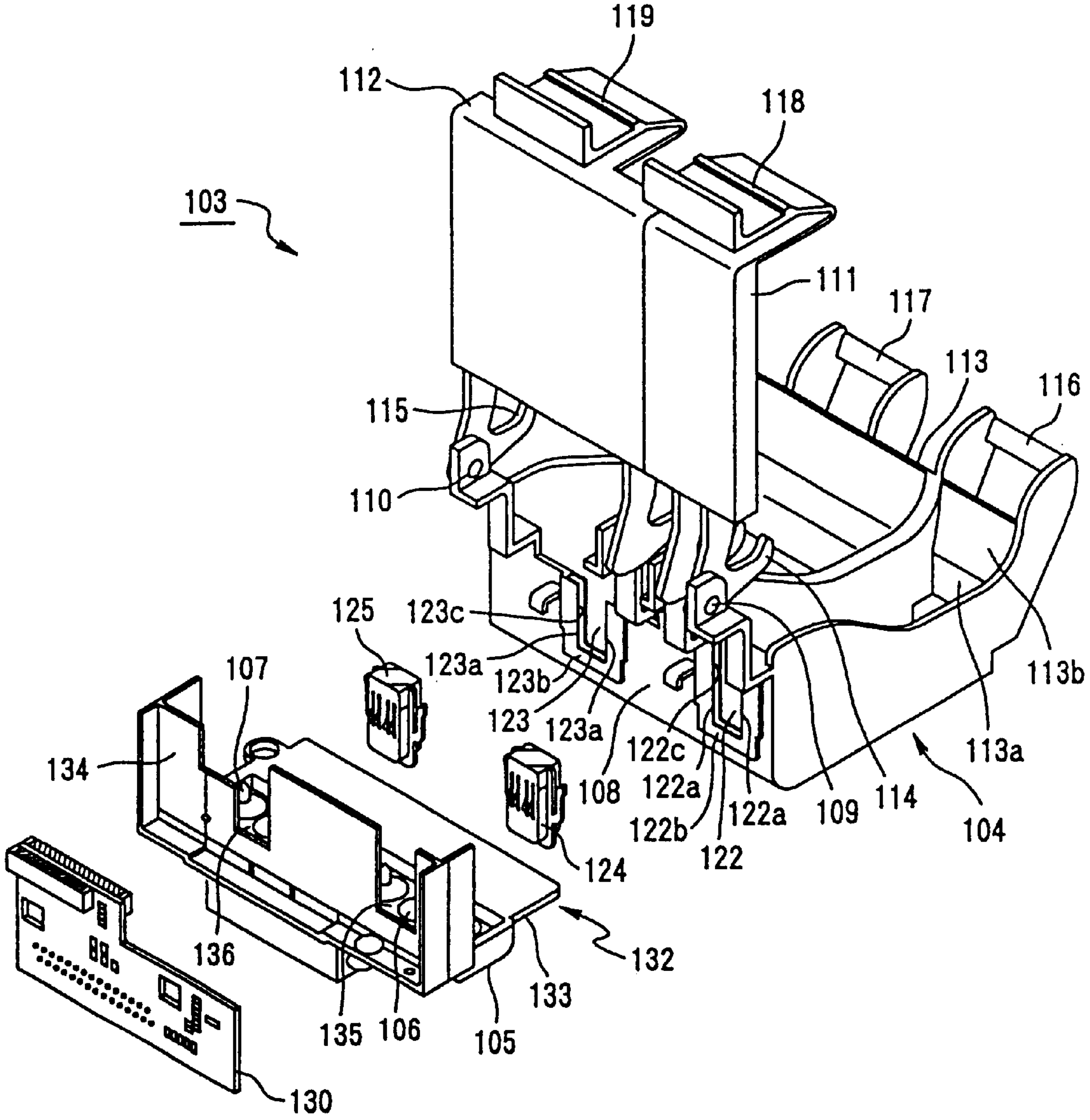
FIG. 17 is a perspective view showing that a carriage is disassembled into a holder section and a header section.

FIG. 17 is a perspective view showing that the carriage is disassembled into a holder section and a header section. Ink supply needles 106 and 107 in communication with the recording head 105 is vertically installed on a bottom surface of the carriage 103 so as to lie on a rear side (on the side of a timing belt 101) of the apparatus. Among the vertical walls forming the holder 104, a vertical wall 108 which is close and opposite to the ink supply needles 106 and 107 has levers 111 and 112 attached to an upper end thereof and which can be rotationally moved by shafts 109 and 110. A wall 113 located at a free end side of the levers 111 and 112 has a vertical portion 113*a* in a bottom side part and an inclined surface portion 113*b* in an upper area, the inclined surface portion extending upward in a fashion fanning out.

The levers 111 and 112 have projections 114 and 115 formed to extend from the neighborhoods of the shafts 109 and 110 substantially perpendicularly to the body of the levers 111 and 112, the projections engaging with raised portions 145 and 156 located at upper ends of ink cartridges 140 and 150. The levers 111 and 112 also have hook sections 118 and 119 that elastically engage with suspension portions 116 and 117 formed on the inclined surface portion 113*b* of the holder 104.

Figure 20:
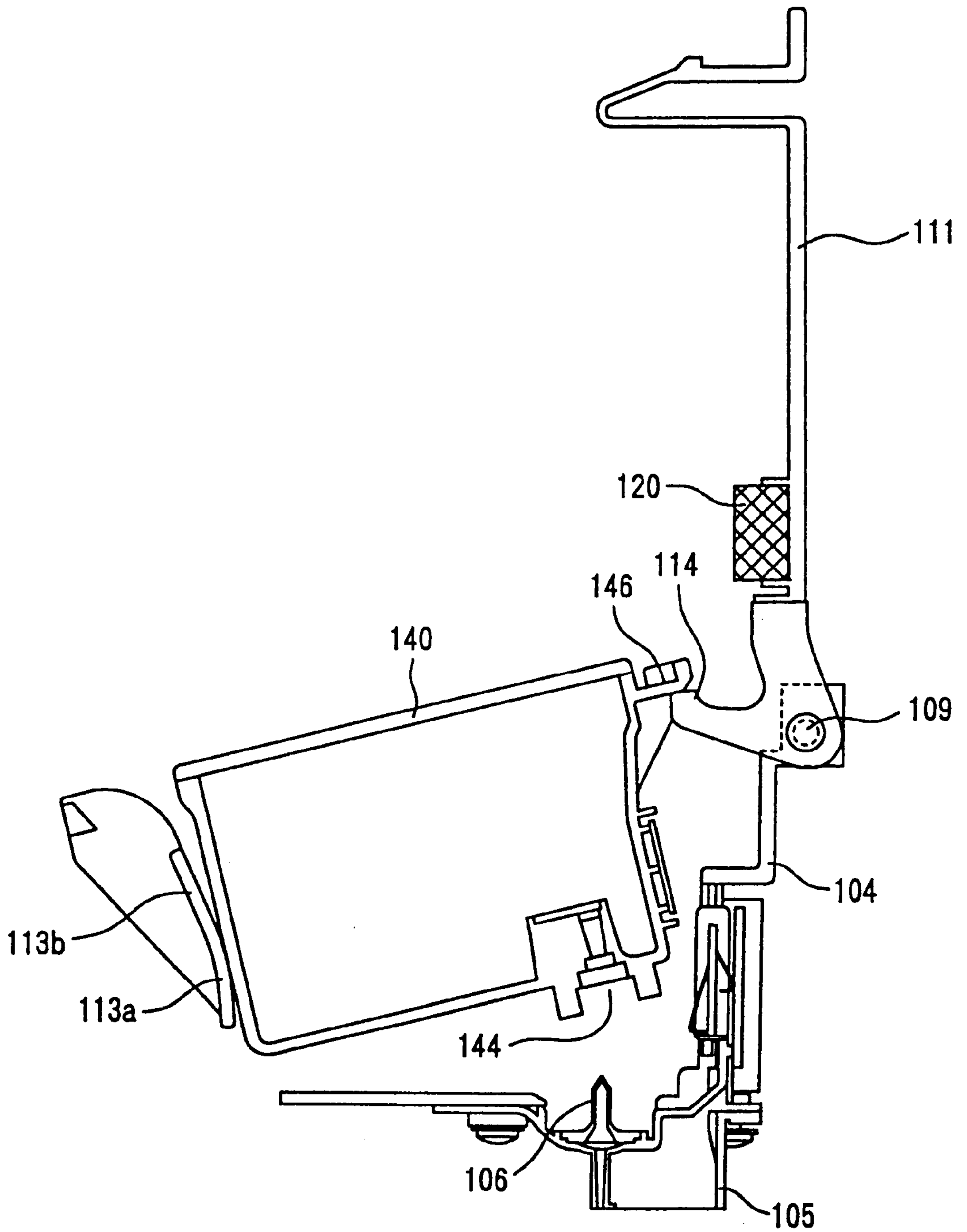
FIG. 20 is a view (1) useful in explaining how an ink cartridge is installed.
Figure 21:
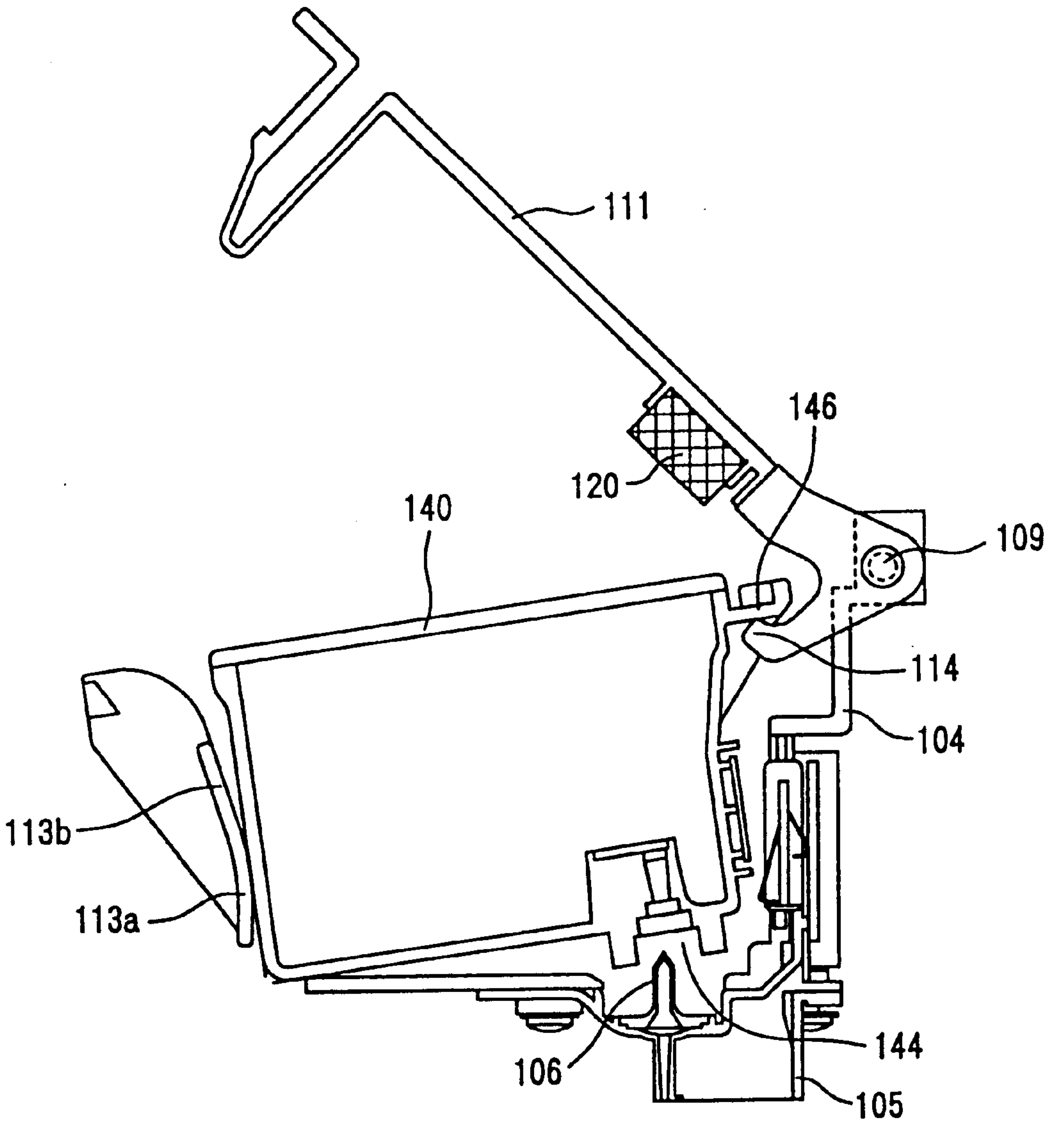
FIG. 21 is a view (2) useful in explaining how the ink cartridge is installed.

The levers 111 and 112 have elastic members 120 and 121, respectively, provided on a rear surface thereof (opposite to a cover 143 of the ink cartridge 140) as shown in FIGS. 20 and 21. The elastic members 120 and 121 elastically press at least areas of the ink cartridges 140 and 150, respectively, which are opposite to ink supply ports 144 and 154 when the ink cartridges 140 and 150 are set in regular positions.

Further, a vertical wall 108 located closer to the ink supply needles 106 and 107 has windows 122 and 123 with an open top portion. Vertical walls 122*a* and 123*a* and bottom surfaces 122*b* and 123*b* forming the windows 122 and 123, respectively, have continuous grooves 122*c* and 123*c,* respectively, formed therein. Contact mechanisms 124 and 125 are inserted and fixed in the grooves 122*c* and 123*c,* respectively.

The recording head 105 is fixed to the bottom surface of the holder 104 via a horizontal portion 133 of a generally L-shaped base 132. A vertical wall 134 of the base 132 has windows 135 and 136 in areas thereof which are opposite to the contact mechanisms 124 and 125, respectively, with a circuit substrate 130 held in front of the vertical wall 134.

The circuit substrate 130 is connected to the apparatus main body controlling section 2 via a flexible cable 137 as shown in FIG. 16. The circuit substrate 130 has a gate array IC mounted thereon and constituting the memory access controlling section 3.

Figure 18:
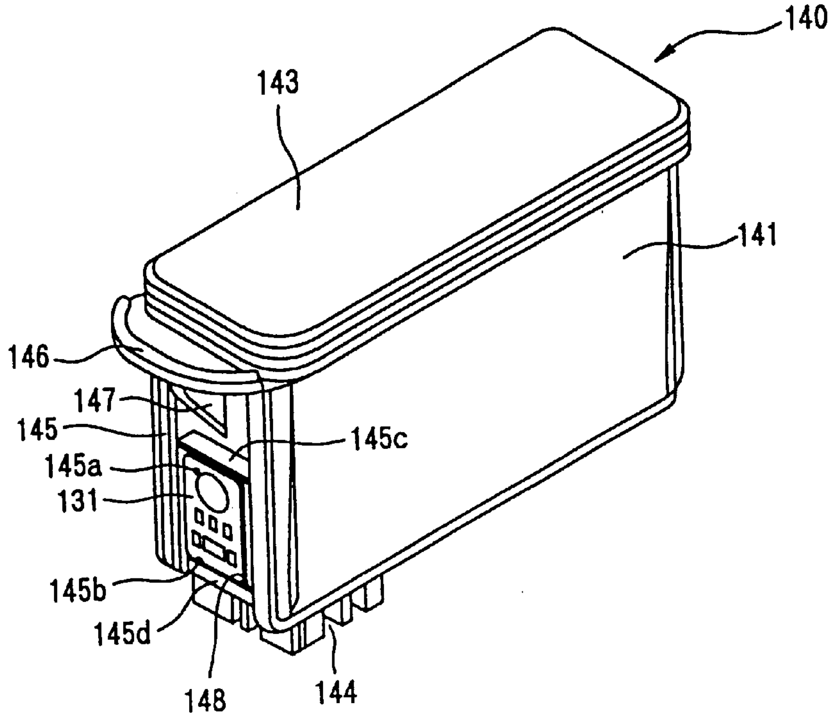
FIG. 18 is a perspective view of an ink cartridge.
Figure 18:
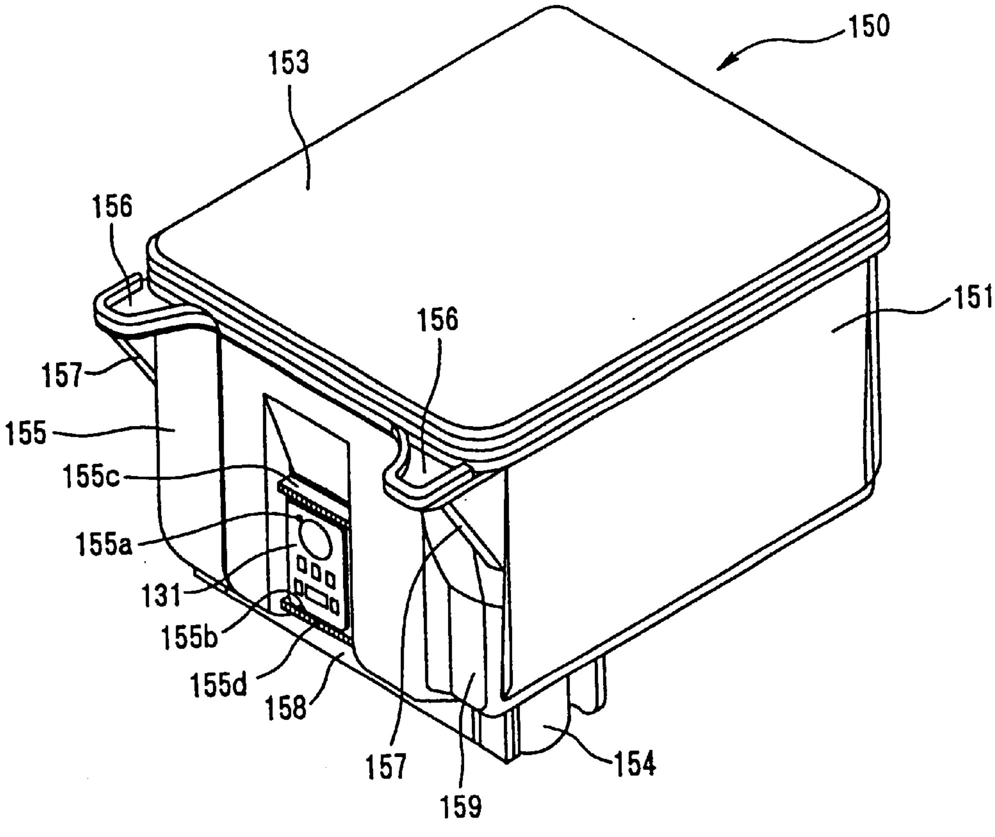

FIG. 18 is a perspective view of the ink cartridge. FIG. 18(*a*) shows the black ink cartridge 140, and FIG. 18(*b*) shows the color ink cartridge 150. The ink cartridges 140 and 150 comprise generally rectangular parallelopiped containers 141 and 151 accommodating a porous body (not shown) with ink impregnated therewith, and the covers 143 and 153 sealing top surfaces of the cartridges.

The containers 141 and 151 have the ink supply ports 144 and 145 formed in bottom surfaces thereof and at positions set opposite to the ink supply needles 106 and 107 when the containers are installed in ink cartridge housing sections 140*a* and 104*a* of the holder 104 shown in FIG. 16. Further, vertical walls 145 and 155 located on the side of the ink supply ports 144 and 145 have the raised portions 146 and 145 integrally formed at upper ends thereof and engaging with the projections 114 and 115 of the levers 111 and 112.

The raised portion 146 of the black ink cartridge 140 is formed to extend continuously from one end to the other end. A triangular rib 147 is formed between a bottom surface of the raised portion 146 and the vertical wall 145. The raised portion 156 of the color ink cartridge 150 is formed individually on opposite sides of the vertical wall 155. A triangular rib 157 is formed between a bottom surface of the raised portion 156 and the vertical wall 155. Reference numeral 159 denotes a mis-insertion preventing recess portion.

The vertical walls 145 and 155 have recess portions 148 and 158, respectively, located at the axial center of the ink cartridges 140 and 150, respectively. Non-volatile memory circuit boards 131 and 131 are installed in the recess portions 148 and 158.

Figure 19:
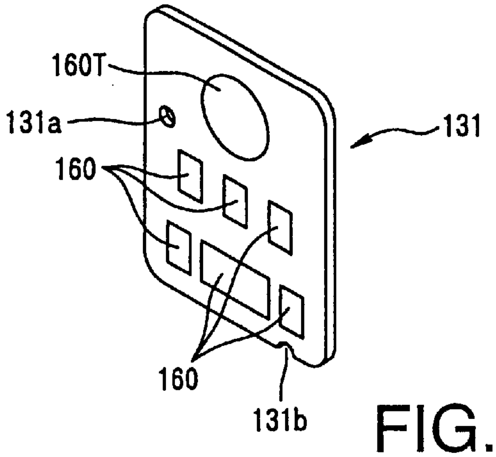
FIG. 19 is a view useful in explaining the structure of a non-volatile memory circuit board.
Figure 19:
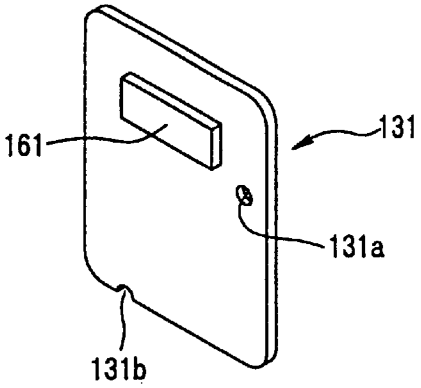
Figure 19:
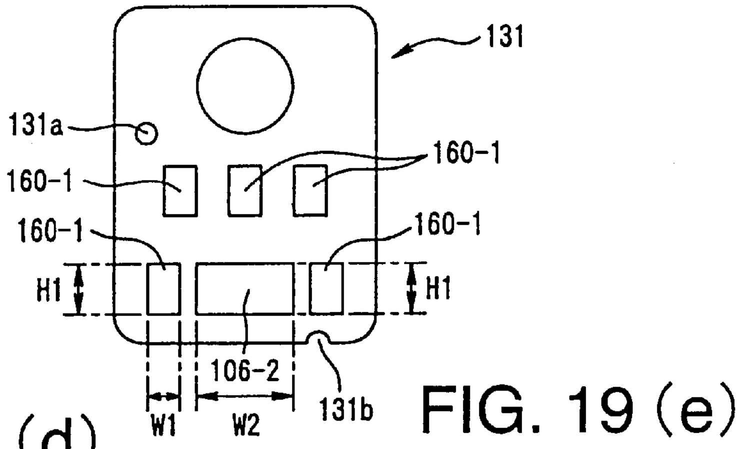
Figure 19:
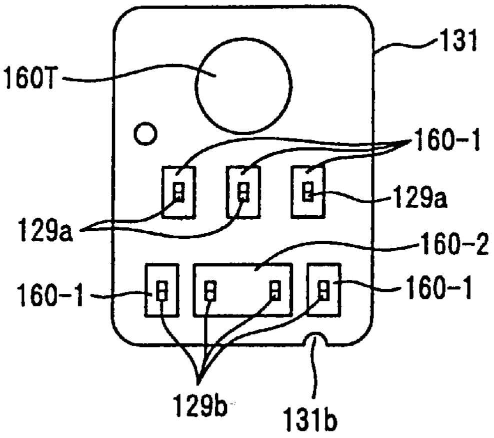
Figure 19:
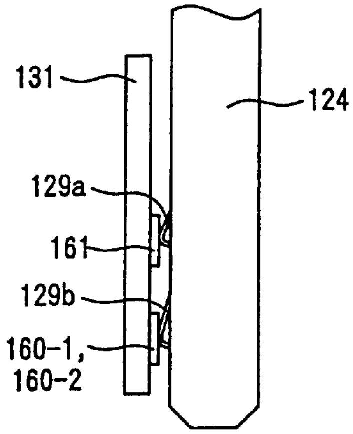

FIG. 19 is a view useful in explaining the structure of the non-volatile memory circuit board. FIG. 19(*a*) is a perspective view showing the front-side structure of the non-volatile memory circuit board 131. FIG. 19(*b*) is a perspective view showing the rear-side structure of the non-volatile memory circuit board 131. FIG. 19(*c*) is a view useful in explaining the size of electrodes. FIG. 19(*d*) is a top view showing how electrodes and contacts contact with one another. FIG. 19(*e*) is a side view showing how the electrodes and the contacts contact with one another.

As shown in FIG. 19(*a*), the non-volatile memory circuit board 131 has a plurality of electrodes 160 (160-1 and 160-2) disposed on its surface in two rows in an ink cartridge inserting direction (vertical direction of the figure) and opposite to contact forming members 129*a* and 129*b* of the contact mechanism 124.

As shown in FIG. 19(*b*), the non-volatile memory circuit board 131 has an IC chip 161 of the non-volatile memories 4 and 5 mounted on its rear surface. Terminals (not shown)

of the IC chip 161 are electrically connected to the contacts 160 via a wiring pattern, through-holes, and the like (not shown). The IC chip 161 of the non-volatile memories 4 and 5 mounted on the non-volatile memory circuit board 131 may be protected by coating it with an ink-resistant material.

As shown in FIG. 19(*c*), the smaller electrode 160-1 has a height H1 of 1.8 mm and a width W1 of 1 mm. The larger electrode 160-2 has a height H1 of 1.8 mm and a width W1 of 3 mm. The heights of the electrodes 160 are set so as to reliably contact with the contact forming members 129*a* and 129*b* even if the ink cartridge 140 or 150 installed in the holder 104 floats.

When the ink cartridges 140 and 150 are installed in the holder 104, the upper contact forming member 129*a* of the contact mechanism 124 contacts with the upper electrode 160-1, while the lower contact forming member 129*b* of the contact mechanism 124 contacts with the lower electrodes 160-1 and 160-2, as shown in FIGS. 19(*d*) and 19(*e*).

As shown in FIG. 19(*d*), the lower larger electrode 160-2 contacts with the two contact forming members 129*a* and 129*b*. Whether or not the ink cartridge is installed is determined by detecting whether or not these two contact forming members 129*a* and 129*b* are electrically connected together.

Reference numeral 160T in FIG. 19 denotes an electrode used for checking during a manufacturing process or the like.

The non-volatile memory circuit board 131 has at least one through-hole 131*a* or a recess portion (notch) 131*b* formed therein.

As shown in FIG. 18, the vertical walls 145 and 155 of the ink cartridges 140 and 150 have projections 145*a*, 145*b*, 155*a*, and 155*b* formed thereon and cooperating with the through-hole 131*a* or the recess portion (notch) 131*b* in the non-volatile memory circuit board 131 for positioning. Furthermore, the vertical walls 145 and 155 have raised portions 145*c*, 145*d*, 155*c*, and 155*d* such as ribs or claws which elastically contact with a side surface of the non-volatile memory circuit board 131.

Thus, when the non-volatile memory circuit board 131 is pressed against the vertical walls 145 and 155 of the ink cartridges 140 and 150, the non-volatile memory circuit 131 can be positioned by the positioning projections 145*a*, 145*b*, 155*a*, and 155*b* and engaged with the raised portions 145*c*, 145*d*, 155*c*, and 155*d* for installation.

FIGS. 20 and 21 are views useful in explaining how the ink cartridge is installed. FIGS. 20 and 21 show a process of installing the black ink cartridge 140. As shown in FIG. 20, when the ink cartridge 140 is inserted into the holder 104 with the lever 111 opened to a substantially vertical position, the raised portion 146 provided at one end of the ink cartridge 140 is received by the projection 114 of the lever 111, and the other end of the ink cartridge 140 is supported and held by the inclined surface portion 113*b* of the holder 104.

In these conditions, when the lever 111 is closed, as shown in FIG. 21, the projection 114 is rotationally moved downward to cause the ink cartridge 140 to lower while substantially maintaining its position established during an initial period of insertion, so that the ink supply port 144 comes into contact with a tip of the ink supply needle 106.

When the lever 111 is further rotationally moved, the ink cartridge 140 is pressed via the elastic member 120. The ink supply port 144 is thereby pushed over the ink supply needle 106. Then, when the lever 111 is fully pushed in, it is fixed to the suspension portion 116 shown in FIG. 17 in such a manner that the ink cartridge 140 is always elastically pressed toward the ink supply needle 106 via the elastic member 120.

The ink cartridge 140 is thereby elastically pressed at a constant pressure with the ink supply port 144 engaged with the ink supply needle 106. Thus, the ink supply port 144 can remain stably and air-tightly engaged with the ink supply needle 106 irrespective of impact or vibration associated with vibration during printing or movement of the recording apparatus.

Figure 22:
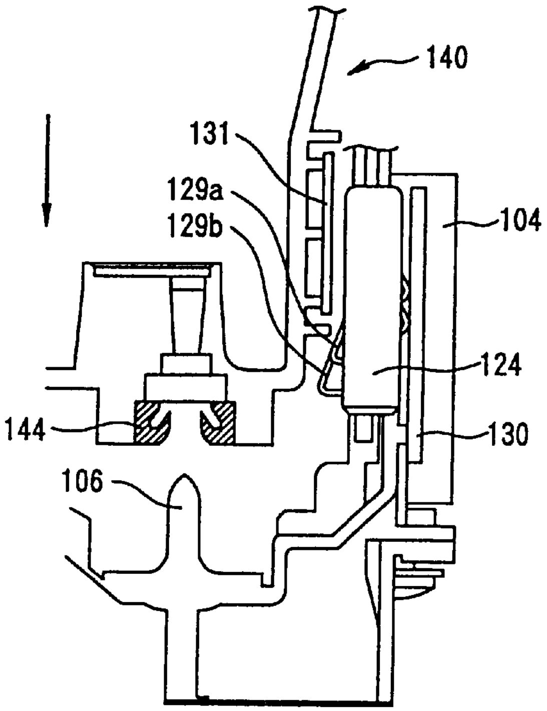
FIG. 22 is a view useful in explaining how a non-volatile memory substrate and a contact forming member of a contact mechanism contact with each other.
Figure 22:
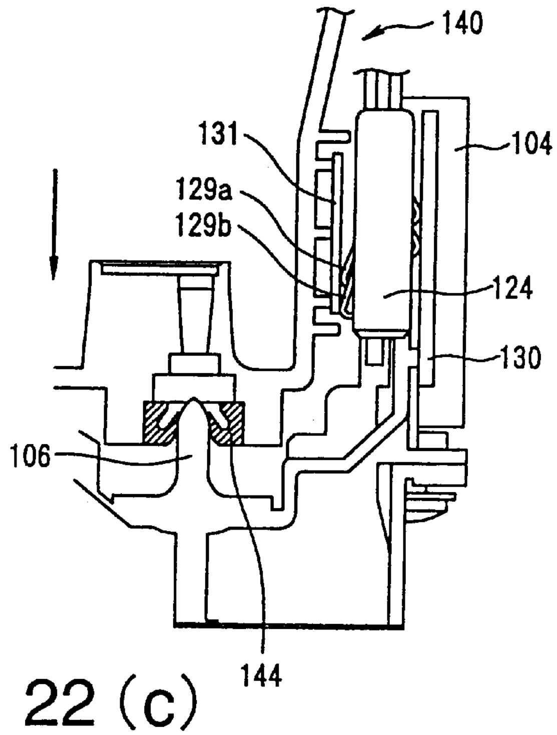
Figure 22:
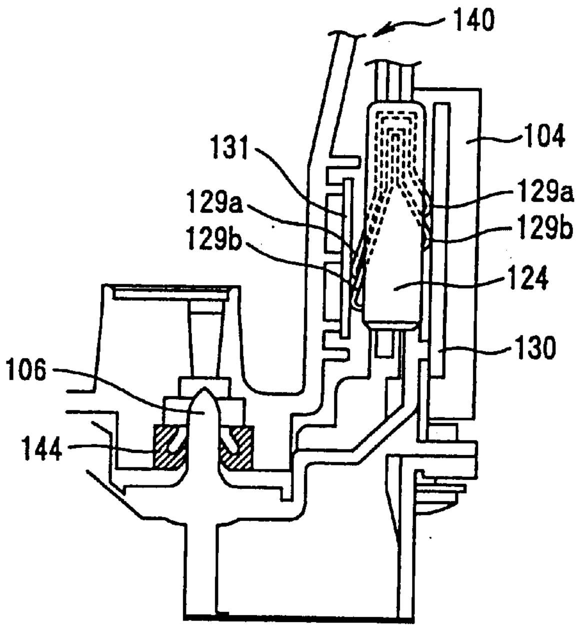

FIG. 22 is a view useful in explaining how the non-volatile memory substrate and the contact forming member of the contact mechanism contact with each other. FIG. 22(*a*) shows a state present before the ink supply port 144 in the ink cartridge 140 comes into contact with the ink supply needle 106 of the holder 104. FIG. 22(*b*) shows that the ink supply port 144 comes into contact with the ink supply needle 106. FIG. 22(*c*) shows that the ink supply needle 106 is fully inserted into the ink supply port 144 (the ink cartridge 140 is completely installed).

As shown in FIG. 22(*c*), when the ink cartridge 140 is completely installed, the terminals (not shown) provided on the non-volatile memory circuit substrate 131 contact with the contact forming members 129*a* and 129*b* provided in the contact mechanism 124. Contact sections 128*a* and 128*b* provided at the other end of the contact forming members 129*a* and 129*b*, respectively, are in contact with the terminals (not shown) provided on the circuit board 130 with the memory access controlling section 3 mounted thereon. The terminals provided on the non-volatile memory circuit 131 are thereby electrically connected via the contact forming members 129*a* and 129*b* to the corresponding terminals of the circuit board 130 with the memory access controlling section 3 (not shown) mounted thereon.

In this embodiment, the ink jet printer apparatus is illustrated as the recording apparatus, but the recording apparatus according to the present invention is applicable to a laser printer apparatus using toner cartridges. Further, the recording apparatus according to the present invention is applicable not only to various printer apparatuses but also to facsimile terminal equipment or various terminal apparatuses comprising a cartridge-replaced recording mechanism. Furthermore, in this embodiment, the configuration with the two non-volatile memories is shown, but only one non-volatile memory may be used. Moreover, the memory access controlling section may control writes to and readouts from three or more non-volatile memories.

INDUSTRIAL APPLICABILITY

As described above, the recording apparatus according to the present invention is configured to execute writes to and readouts from the non-volatile memory via the memory access controlling section, thereby reducing the amount of processing to be executed by the apparatus main body controlling section to access the non-volatile memory.

When the serial-data communicating section is provided to serially communicate data between the apparatus main body controlling section and the memory access controlling section, thus making it possible to reduce the number of signal lines required between the apparatus main body controlling section and the memory access controlling section.

Further, the random access memory is provided, in which data read out from the non-volatile memory are all stored so that the stored data read out in response to a data readout request from the apparatus main body controlling section, thus enabling a fast response to the data readout request.

Furthermore, the apparatus main body controlling section can generate a data write request to renew data in the random access memory and then cause the data renewed in response to the data write request to be written to the non-volatile memory. Thus, even with a plurality of items to be renewed, the plurality of data can be written to the non-volatile memory with a single write operation.

Moreover, in the semiconductor device according to the present invention, the memory access controlling section is formed on the semiconductor substrate to constitute an integrated circuit, thereby contributing to reducing the size of the recording apparatus.

Further, in the recording head apparatus according to the present invention, the memory access controlling section is thus provided in the carriage comprising the section for housing the recording material accommodating cartridge, thereby facilitating the provision of the memory access controlling section.

What is claimed is:

1. A recording apparatus characterized by having a memory access controlling section between an apparatus main body controlling section provided in a recording apparatus main body and a non-volatile memory provided in a recording material accommodating cartridge, in order to control writes to and readouts from said non-volatile memory based on commands supplied by said apparatus main body controlling section, said memory access controlling section adapted to receive a mode set command from the apparatus main body controlling section and operable to store an operation mode embodied in the mode set command in a mode register, said memory access controlling section having a random access memory for temporarily storing data read out from said non-volatile memory, such that when said memory access controlling section receives a memory access controlling operation mode command from said apparatus main body controlling section, said apparatus main body controlling section causes data stored in said non-volatile memory to be transferred to said random access memory, causes various processes to be executed by referencing the data stored in said random access memory to update the data stored in said random access memory, and then causes the data stored in said random access memory to be transferred to said non-volatile memory.

2. The recording apparatus according to claim 1, characterized in that said memory access controlling section comprises a serial data communicating section for executing serial data communication with said apparatus main body controlling section, a command executing section for interpreting and executing a command supplied by said apparatus main body controlling section via the serial data communicating section, and a non-volatile memory write and readout controlling section for executing writes to and readouts from said non-volatile memory.

3. The recording apparatus of claim 1 wherein the non-volatile memory is embodied in a black ink cartridge.

4. The recording apparatus of claim 1 further comprises a second non-volatile memory embodied in a color ink cartridge.

5. The recording apparatus of claim 4 wherein the memory access controlling section further comprises a second random access memory for temporarily storing data read out from said second non-volatile memory.

6. The recording apparatus of claim 1 wherein the memory access controlling section further comprises a non-volatile memory write and readout controlling section interposed between the random access memory and the non-volatile memory, the non-volatile memory write and readout controlling section operable to read information stored in the non-volatile memory and store said information in the random access memory.

7. The recording apparatus of claim 6 wherein the memory access controlling section further comprises a plurality of control registers accessible to the non-volatile memory write and readout controlling section, each of the control registers assigned an address corresponding to a permission setting for the non-volatile memory.

8. The recording apparatus of claim 6 wherein the memory access controlling section further comprises an effective-bit-length data table accessible to the non-volatile memory write and readout controlling section, where the effective-bit-length data table stores correlation data between information residing in the non-volatile memory and a number of data bits associated with said information.

9. The recording apparatus of claim 8 wherein the non-volatile memory write and readout controlling section partitions the information read from the non-volatile memory by using the effective-bit-length data table, such that data having less than eight bits is supplemented with zeros to form 8-bit data and data having more than eight bits is modified to form two byte data.

10. The recording apparatus of claim 1 wherein the non-volatile memory write and readout controlling section stores the modified data as composed sets of 8 bits at predetermined addresses in random access memory.

11. A semiconductor device characterized by having a memory access controlling section formed on a semiconductor substrate, for controlling writes to and readouts from a non-volatile memory based on commands supplied by an apparatus main body controlling section, said memory access controlling section adapted to receive a mode set command from the apparatus main body controlling section and operable to store an operation mode embodied in the mode set command in a mode register, said memory access controlling section having a random access memory for temporarily storing data read out from said non-volatile memory, said apparatus main body controlling section causes data stored in said non-volatile memory to be transferred to said random access memory, causes various processes to be executed by referencing the data stored in said random access memory to update the data stored in said random access memory, and then causes the data stored in said random access memory to be transferred to said non-volatile memory when said memory access controlling section receives a memory access controlling operation mode command from the apparatus main body controlling section.

12. A recording head apparatus characterized by having a section for housing a recording material accommodating cartridge including a non-volatile memory has a memory access controlling section for controlling data transmissions and receptions between a control section of a recording apparatus main body and said non-volatile memory based on commands supplied by said control section of said recording apparatus main body, said memory access controlling section adapted to receive a mode set command from the apparatus main body controlling section and operable to store an operation mode embodied in the mode set command in a mode register, said memory access controlling section having a random access memory for temporarily storing data read out from said non-volatile memory, said apparatus main body controlling section causes data stored in said non-volatile memory to be transferred to said random access memory, causes various processes to be executed by referencing the data stored in said random access memory to update the data stored in said random access memory, and then causes the data stored in said random access memory to be transferred to said non-volatile memory when said memory access controlling section receives a memory access controlling operation mode command from said apparatus main body controlling section.

* * * * *